United States Patent
McCarty et al.

(10) Patent No.: US 9,462,386 B2
(45) Date of Patent: *Oct. 4, 2016

(54) WIRED, WIRELESS, INFRARED, AND POWERLINE AUDIO ENTERTAINMENT SYSTEMS

(75) Inventors: William A. McCarty, San Diego, CA (US); Yadir Rodriguez, San Ysidro, CA (US)

(73) Assignee: KSC INDUSTRIES, INC., Chula Vista, CA (US)

(*) Notice: Subject to any disclaimer, the term of this patent is extended or adjusted under 35 U.S.C. 154(b) by 975 days.

This patent is subject to a terminal disclaimer.

(21) Appl. No.: 13/356,522

(22) Filed: Jan. 23, 2012

(65) Prior Publication Data

US 2012/0121104 A1 May 17, 2012

Related U.S. Application Data

(62) Division of application No. 10/353,805, filed on Jan. 27, 2003, now Pat. No. 8,103,009.

(60) Provisional application No. 60/351,843, filed on Jan. 25, 2002, provisional application No. 60/353,806, filed on Feb. 1, 2002, provisional application No. 60/371,268, filed on Apr. 8, 2002, provisional application No. 60/407,432, filed on Aug. 28, 2002.

(51) Int. Cl.
*H04R 29/00* (2006.01)
*H04R 5/04* (2006.01)
(Continued)

(52) U.S. Cl.
CPC ........ *H04R 5/04* (2013.01); *H04B 3/54* (2013.01); *H04R 27/00* (2013.01);
(Continued)

(58) Field of Classification Search
CPC .... H04H 20/93; H04H 60/27; H04H 60/375; H04R 1/10; H04R 27/00; H04R 3/02; H04N 5/4403; H04N 21/485; H04N 21/4882; H04N 21/482; H04N 21/8133

USPC .......... 381/56–58, 1–4, 27, 11, 81, 77, 105, 381/307, 300, 306, 113; 700/94; 455/73, 455/3.06, 575.1
See application file for complete search history.

(56) References Cited

U.S. PATENT DOCUMENTS 3,942,170 A  3/1976  Whyte
4,319,224 A  3/1982  Tappeiner et al.
(Continued)

FOREIGN PATENT DOCUMENTS

EP  0 389 174     9/1990
EP  0 389 174 B1  9/1990
(Continued)

OTHER PUBLICATIONS

Office Action issued in a potentially related application, U.S. Appl. No. 10/783,718 dated Feb. 5, 2009.
(Continued)

*Primary Examiner* — Lun-See Lao
(74) *Attorney, Agent, or Firm* — Knobbe Martens Olson & Bear LLP

(57) ABSTRACT

A method and system for communicating audio signals between an input device and an output device via a network. The output device can include loudspeakers and headphones. In some embodiments an output device, for example a center channel speaker, transmits audio signals to other output devices. In some embodiments, the output device is coupled to, or combined with, a speaker stand or speaker bracket. The network can be wireless, wired, infrared, RF, and powerline.

26 Claims, 18 Drawing Sheets

(51) Int. Cl.
*H04B 3/54* (2006.01)
*H04R 27/00* (2006.01)
*H04S 3/00* (2006.01)

(52) U.S. Cl.
CPC .. *H04B 2203/545* (2013.01); *H04R 2205/022* (2013.01); *H04R 2205/024* (2013.01); *H04R 2420/07* (2013.01); *H04R 2499/15* (2013.01); *H04S 3/00* (2013.01)

(56) References Cited

U.S. PATENT DOCUMENTS

| | | | |
|---|---|---|---|
| 4,523,128 A | 6/1985 | Stamm et al. | |
| 4,621,374 A | 11/1986 | Micic et al. | |
| 4,829,500 A | 5/1989 | Saunders | |
| 4,845,751 A | 7/1989 | Schwab | |
| 5,095,382 A | 3/1992 | Abe | |
| 5,181,247 A | 1/1993 | Holl | |
| 5,182,552 A | 1/1993 | Paynting | |
| 5,218,641 A | 6/1993 | Abe et al. | |
| 5,233,663 A | 8/1993 | Wood | |
| 5,323,234 A | 6/1994 | Kawasaki | |
| 5,361,381 A * | 11/1994 | Short | 381/80 |
| 5,406,634 A | 4/1995 | Anderson et al. | |
| 5,410,735 A | 4/1995 | Borchardt et al. | |
| 5,428,341 A | 6/1995 | Takahashi | |
| 5,471,190 A | 11/1995 | Zimmermann | |
| 5,491,755 A | 2/1996 | Vogt et al. | |
| 5,491,839 A | 2/1996 | Shotz | |
| 5,524,060 A | 6/1996 | Silfvast et al. | |
| 5,579,304 A | 11/1996 | Sugimoto et al. | |
| 5,596,603 A | 1/1997 | Haupt et al. | |
| 5,646,602 A | 7/1997 | Gertz et al. | |
| 5,652,766 A | 7/1997 | Matsumura et al. | |
| 5,661,848 A | 8/1997 | Bonke et al. | |
| 5,666,422 A | 9/1997 | Harrison et al. | |
| 5,666,658 A | 9/1997 | Borchardt et al. | |
| 5,668,884 A | 9/1997 | Claire et al. | |
| 5,694,436 A | 12/1997 | Huang et al. | |
| 5,778,077 A | 7/1998 | Davidson | |
| 5,784,468 A | 7/1998 | Klayman | |
| 5,818,247 A | 10/1998 | Pyun | |
| 5,832,024 A | 11/1998 | Schotz et al. | |
| 5,867,223 A | 2/1999 | Schindler et al. | |
| 5,930,370 A | 7/1999 | Ruzicka | |
| 5,933,430 A | 8/1999 | Osakabe et al. | |
| 5,946,343 A | 8/1999 | Schotz et al. | |
| 6,006,115 A | 12/1999 | Wingate | |
| 6,041,225 A | 3/2000 | Jung | |
| 6,058,106 A | 5/2000 | Cudak et al. | |
| 6,061,455 A | 5/2000 | Hadley et al. | |
| 6,157,292 A | 12/2000 | Piercy et al. | |
| 6,215,981 B1 | 4/2001 | Borchardt et al. | |
| 6,233,002 B1 | 5/2001 | Shibayama | |
| 6,243,413 B1 | 6/2001 | Beukema | |
| 6,337,913 B1 | 1/2002 | Chang | |
| 6,445,369 B1 | 9/2002 | Yang et al. | |
| 6,466,832 B1 | 10/2002 | Zuqert et al. | |
| 6,487,296 B1 | 11/2002 | Allen et al. | |
| 6,493,244 B1 | 12/2002 | Gray | |
| 6,507,273 B1 * | 1/2003 | Chang et al. | 340/3.1 |
| 6,590,982 B1 | 7/2003 | Chen | |
| 6,608,907 B1 | 8/2003 | Lee | |
| 6,611,537 B1 | 8/2003 | Edens et al. | |
| 6,754,354 B1 | 6/2004 | Lokhoff | |
| 6,798,647 B2 | 9/2004 | Dickie | |
| 7,043,671 B2 * | 5/2006 | Bader et al. | 714/701 |
| 7,046,813 B1 * | 5/2006 | Denda | G09B 5/04 381/98 |
| 7,091,849 B1 | 8/2006 | Henry | |
| 7,187,947 B1 | 3/2007 | White et al. | |
| 7,190,798 B2 | 3/2007 | Yasuhara | |
| 7,346,332 B2 | 3/2008 | McCarty et al. | |
| 7,664,273 B2 | 2/2010 | Christensen et al. | |
| 7,822,983 B2 | 10/2010 | Aull et al. | |
| 8,103,009 B2 * | 1/2012 | McCarty et al. | 381/58 |
| 2002/0048381 A1 | 4/2002 | Tamayama | |
| 2002/0072816 A1 * | 6/2002 | Shdema et al. | 700/94 |
| 2002/0101357 A1 | 8/2002 | Gharapetian | |
| 2002/0135513 A1 | 9/2002 | Paschen et al. | |
| 2002/0145509 A1 | 10/2002 | Karny et al. | |
| 2003/0062990 A1 | 4/2003 | Schaeffer et al. | |
| 2003/0095096 A1 | 5/2003 | Robbin et al. | |
| 2003/0231781 A1 | 12/2003 | Billington | |
| 2004/0037433 A1 | 2/2004 | Chen | |
| 2004/0058649 A1 | 3/2004 | Grady | |
| 2004/0062270 A1 | 4/2004 | Son et al. | |
| 2004/0097851 A1 | 5/2004 | Inada et al. | |
| 2004/0131193 A1 | 7/2004 | Kitamura | |
| 2004/0148419 A1 | 7/2004 | Chen et al. | |
| 2004/0223622 A1 * | 11/2004 | Lindemann et al. | 381/79 |
| 2004/0250273 A1 | 12/2004 | Swix et al. | |
| 2005/0010417 A1 | 1/2005 | Holmes | |
| 2009/0102626 A1 | 4/2009 | Lesesky | |

FOREIGN PATENT DOCUMENTS

| | | |
|---|---|---|
| EP | 0 471 477 A1 | 2/1992 |
| EP | 0 471 477 B1 | 2/1992 |
| EP | 0 613 320 A2 | 8/1994 |
| EP | 0 613 320 B1 | 8/1994 |
| EP | 0 637 796 B1 | 8/1994 |
| EP | 0 637 796 A3 | 3/1995 |
| EP | 0 493 986 B1 | 12/1995 |
| EP | 1 096 715 A2 | 5/2001 |
| EP | 1 096 716 A2 | 5/2001 |
| EP | 1 096 717 A2 | 5/2001 |
| JP | 200116879 | 6/2001 |
| JP | 200116880 | 6/2001 |
| JP | 200117750 | 6/2001 |
| WO | WO 99/39546 | 8/1999 |

OTHER PUBLICATIONS

Office Action issued in a potentially related application, U.S. Appl. No. 10/783,718 dated Jul. 10, 2008.
Office Action issued in a potentially related application, U.S. Appl. No. 10/783,718 dated Jul. 30, 2009.
Office Action issued in a potentially related application, U.S. Appl. No. 12/050,786 dated Jul. 23, 2009.
Communication Systems Design; "HomePlug Standard Brings Networking to the Home;" Dec. 2000; http://www.csdmag.com/main/2000/12/0012feat5.htm, 9 pages, printed Jan. 10, 2003.
Digigram EtherSpeaker, Networked Speaker Development Module; www.digigram.com, 4 pages, undated.
FREESPAN™ Pure Digital Transmission, 4 pages, promotional brochure.
Intellon Corporation, "PowerPacket™ Primer;" www.intellon.com, 5 pages, undated, 2001.
Meridian's Brochure, "Speakers;" http://meridian-audio.com/m_bro_spk.htm, 6 pages, printed Dec. 21, 2001.
PhonexBroadband, QX-201 NeverWire 14; www.phonex.com, 1 page, 2002.
Sony Consumer Electronics Guide: MDR-DS5100; http://www.sel.sony.com/SEL/consumer/ss5/home/accessories/virtualdolbyrtmdigit;7 pages, undated, 2000.
Texas Instruments, True Digital Audio Amplifier TAS5100 PWM Power Output Stage; www.ti.com, 15 pages, Revised May 2001.
Office Action for U.S. Appl. No. 12/020,456 dated Jun. 28, 2012 by the U.S. Patent and Trademark Office.

* cited by examiner

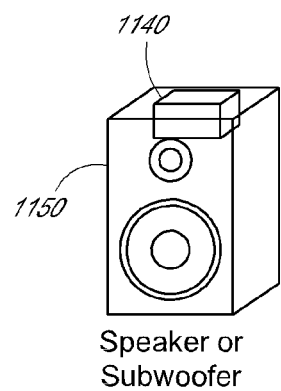
Speaker or
Subwoofer
FIG. 11B(1)
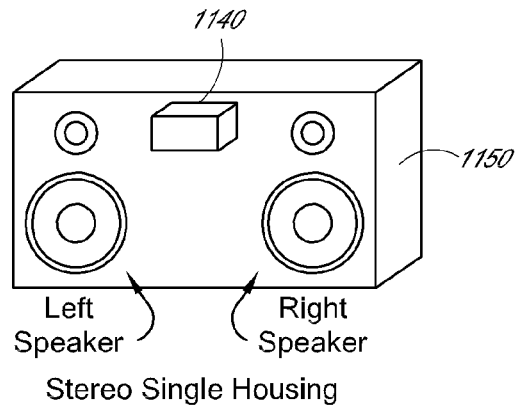
FIG. 11B(2)
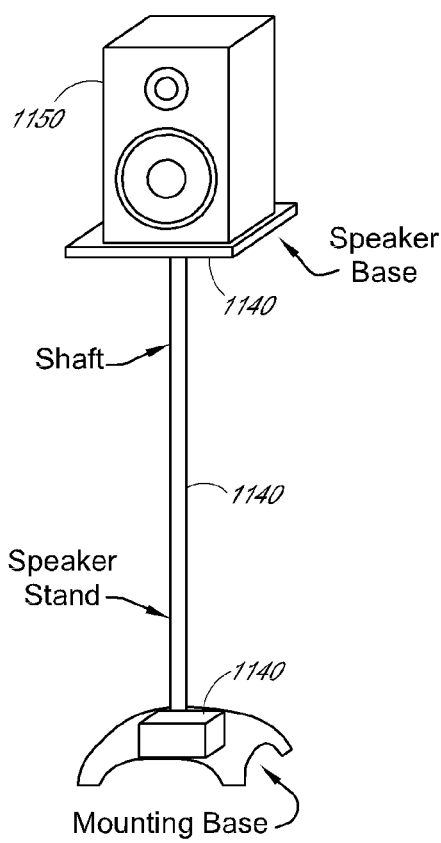
FIG. 11B(3)
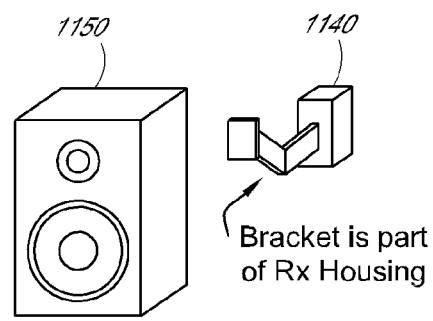
FIG. 11B(4)
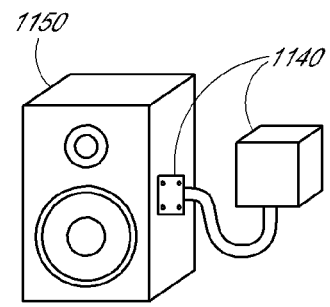
FIG. 11B(5)

WIRED, WIRELESS, INFRARED, AND POWERLINE AUDIO ENTERTAINMENT SYSTEMS

RELATED APPLICATIONS

This application is a divisional of co-pending patent application Ser. No. 10/353,805, filed Jan. 27, 2003 and entitled Wired, Wireless, Infrared, and Powerline Audio Entertainment Systems, which claims priority to provisional patent application Ser. Nos. 60/351,843, filed Jan. 25, 2002 and entitled Wired, Wireless, and Powerline Audio Entertainment Systems, 60/353,806, filed Feb. 1, 2002 and entitled Wired, Wireless, and Powerline Audio Entertainment Systems, 60/371,268, filed Apr. 8, 2002, and entitled Wired, Wireless, Infrared, and Powerline Audio Entertainment Systems, and 60/407,432, filed Aug. 28, 2002, and entitled Wired, Wireless, Infrared, and Powerline Audio Entertainment Systems. Each of the above applications is incorporated by reference hereby in its entirety.

BACKGROUND OF THE INVENTION

1. Field of the Invention

This invention relates to home networks. More particularly, the invention provides a method and system for communicating audio and control signals, via a wired, wireless, infrared, or a powerline medium, to control one or more remote entertainment systems throughout a home.

2. Description of Related Art

A communication system for a home network facilitates two-way communication between a plurality of devices within the home. These devices can be fixed or portable and can include, for example, televisions, computers, stereos, speakers, monitors, printers, and other electronic appliances. For these devices to communicate throughout a home, they interface with the home network.

SUMMARY OF THE INVENTION

The systems and methods of the present invention have several features, no single one of which is solely responsible for its desirable attributes. Without limiting the scope of this invention, its more prominent features will now be discussed briefly. After considering this discussion, and particularly after reading the section entitled "Detailed Description of the Preferred Embodiments" one will understand how the features of this invention provide several advantages over traditional audio entertainment systems.

One aspect of the invention relates to a method for communicating an audio signal along with an associated control signal between a source transmitter bridged to a wired, wireless, infrared, or powerline data stream or network.

Another aspect of the invention relates to a system including a receiver, processor, and amplifier wherein the audio signal and the associated control signal are received via the network. The audio signal is amplified and broadcast via a loudspeaker. Embodiments of the loudspeaker include headphones, mono loudspeaker, stereo loudspeaker, and multi-channel loudspeaker systems.

Still another aspect is a method for providing an audio signal and a control signal that is generated by an input device to a remote loudspeaker via a network comprising receiving an audio signal from the input device, detecting a characteristic associated with the audio signal, coding the characteristic into a control signal, and transmitting the audio signal and the control signal to a loudspeaker via the network.

Yet another aspect is a communication system configured to provide an audio signal and a control signal to a remote loudspeaker. The system comprises a transmitter module configured to receive an audio signal, combine the audio signal with a control signal to form a combined signal, and transmit the combined signal via a network and a receiver module configured to receive the combined signal from the network and extract the control signal and the audio signal from the combined signal.

A further aspect is an apparatus configured to transmit an audio signal and a control signal associated with the audio signal via a network. The apparatus comprises an audio input module having a first receptacle and a second receptacle, both configured to attach to an input device and an input selector module configured to select the first receptacle and the second receptacle. The apparatus further comprises a signal processing module configured to receive the audio signal associated with the selected receptacle and combine the audio signal with a control signal to form a combined signal and a network module configured to format and transmit the combined signal via the network.

Another aspect is a loudspeaker configured to receive a combined signal via a network, wherein the combined signal includes an audio signal and a control signal associated with the audio signal. The loudspeaker comprises a network module coupled to the network and configured to receive the combined signal and unformat the combined signal, a signal processing module coupled to the network module and configured to extract the audio signal and the control signal from the combined signal, and a digital to analog converter configured to convert the extracted audio signal into an analog form for broadcasting by the loudspeaker.

A further aspect is a center channel speaker configured to provide an audio signal and a control signal to one or more remote speakers. The center channel speaker comprises a digital signal processor (DSP) module configured to process a center channel signal and a satellite channel signal, an amplifier module configured to convert the processed center channel signal to pulse width modulation, a power stage module configured to digitally amplify the pulse width modulation signal for broadcast by a center channel loudspeaker, and an IR transmitter configured to transmit the satellite channel signal to a satellite speaker.

Still another aspect is a wireless stereo speaker comprising a wireless receiver configured to receive a wireless audio signal. The speaker comprising a signal processing module configured to extract audio channels from the audio signal and an amplifier module configured to convert the extracted audio channels to pulse width modulation. The speaker further comprising a power stage module configured to digitally amplify the pulse width modulation audio channels, two or more loudspeaker configured to broadcast the amplified audio channels, and a power supply configured to provide power to the power stage module.

A further aspect is a housing comprising a wireless receiver module configured to receive a wireless audio signal, a amplifier module configured to convert the wireless audio signal to pulse width modulation, a power stage module configured to digitally amplify the pulse width modulation audio channels, and a speaker mount member configured for attachment to a speaker.

Another aspect is a speaker enclosure configured to transmit a combined audio and control signal to a satellite speaker comprising a digital signal processor (DSP) module configured to process a first channel signal and a second channel signal received from a source, a loudspeaker configured to broadcast the first channel, and a transmitter module configured to transmit the second channel signal to a satellite speaker.

Still another aspect is a transmitter module for a home media network comprising a housing, at least one connector for receiving an analog input, a volume sensor coupled to the connector for receiving an analog input, and a digital processing circuit configured to process signals received from the connectors and the volume sensor and output a combined control and audio signal.

A further aspect is a housing for a wireless receiver comprising an infrared detector on a first surface of the housing and configured to receive a combined audio and control signal, a receiver coupled to the detector and configured to decode and extract an audio signal from the combined audio and control signal, an amplifier coupled to the infrared receiver and configured to manipulate and amplify the audio signal and broadcast the amplified audio signal, and an audio output line coupled to the amplifier and configured to provide the manipulated audio signal to a loudspeaker.

BRIEF DESCRIPTION OF THE DRAWINGS

FIG. 11B is a diagram showing multiple embodiments of a loudspeaker and receiver components from FIG. 11A.

DETAILED DESCRIPTION OF THE PREFERRED EMBODIMENTS

Preferred embodiments of the present invention will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific preferred embodiments of the present invention.

In connection with the following description many of the components of the various systems and the entire systems, some of which are referred to as "module," can be implemented as software, firmware or a hardware component, such as a Field Programmable Gate Array (FPGA) or Application-Specific Integrated Circuit (ASIC), which performs certain tasks. Such components or modules may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented to execute on one or more computers.

Figure 1:
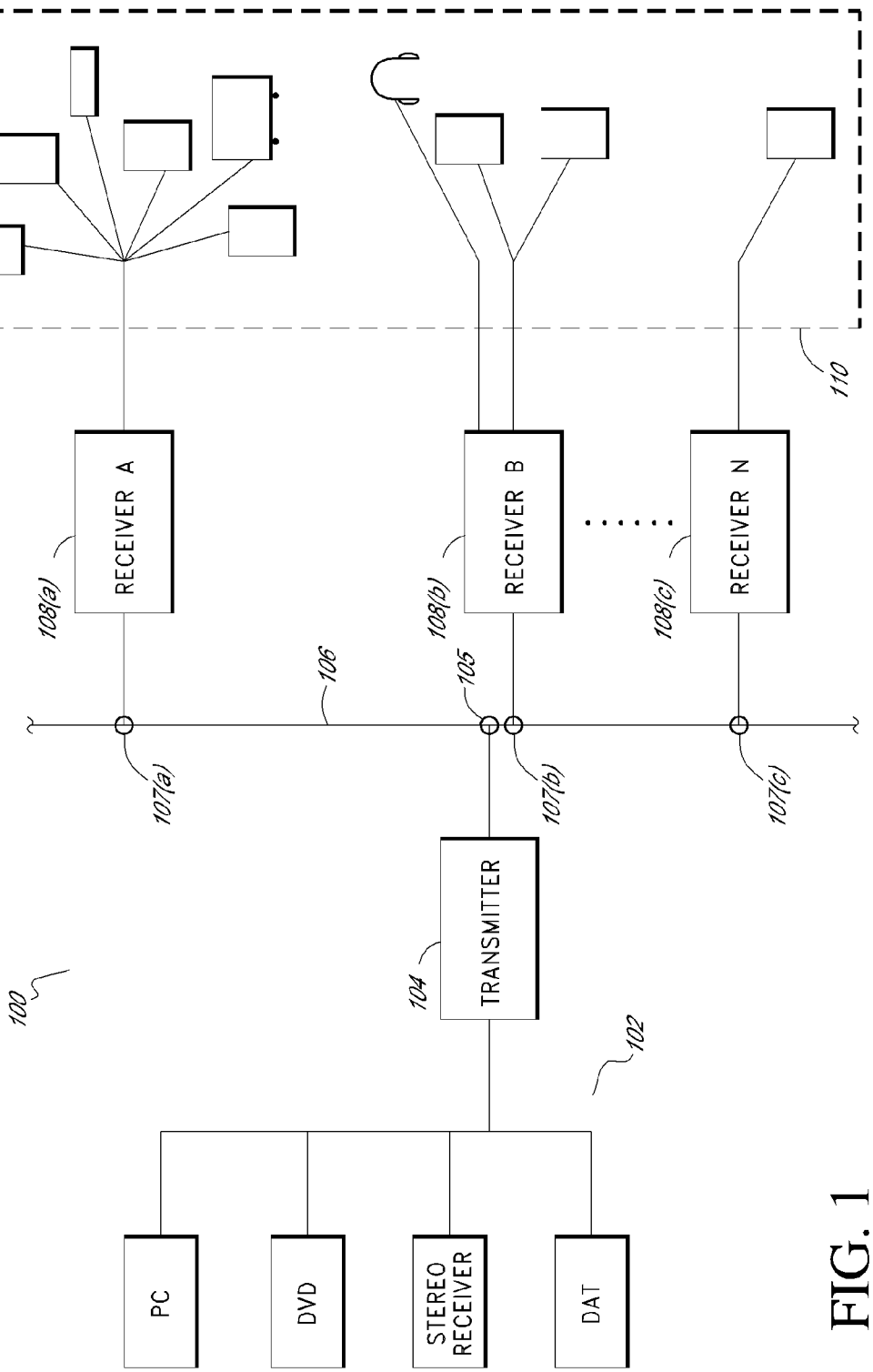
FIG. 1 is a block diagram of a communication system for a home network that can be connected using a wired, wireless, or powerline network.

FIG. 1 is a block diagram of a communication system 100 configured to provide network connectivity throughout a home. The communication system 100 receives an input signal from an input device 102. Types of input signals can include, for example, audio, video, textual, and control signals. These signals can originate from one or more input devices 102 depending on the type of input signal. For ease of explanation, the following description uses an audio signal as an exemplary input signal to the communication system 100. However, the communication system 100 is not so limited and can be used with video, textual, and any other information signal. Examples of input devices 102 that generate an audio signal include a personal computer, digital video disk (DVD) player, a stereo receiver, MP3 player, compact disk (CD) player, digital audio tape (DAT), and the like. Examples of control signals include, volume level, fader level, balance level, sub-bass level, destination source, sound processing selection, equalizer levels, power on, power off, or any other manipulation of the audio signal.

Connected to the input devices 102 is a transmitter module 104. The transmitter module 104 receives the audio signal, and any control signals, from the input devices 102. As mentioned above, an exemplary control signal is a desired volume level. The sources of the control signal can include the input device 102. In one embodiment, the transmitter module 104 includes a Digital Signal Processor (DSP) (not shown). The DSP is configured to process and encode the control signal and the audio signal prior to their transmission by the transmitter module 104. For example, the address of a destination receiver module 108(a)-(n) can be encoded by the DSP. Alternatively, control signals can originate at the transmitter module 104. For example, a switch (not shown) can be coupled to the transmitter 104 to allow a user to select the destination receiver module 108(a)-(n) that will receive the audio signal.

The network or transmitter module 104 forms a bridge between the input devices 102 and a network, for example, a powerline medium 106. A powerline network uses an existing infrastructure of alternating current (AC) electrical power outlets in the walls of a home or building to form multiple electrical connections between any two of the power outlets. Power outlets are located almost everywhere someone might want to use a networked device in a home or building. Thus, the powerline network allows a user to remotely connect to the networked device via the existing power outlets. The network in FIG. 1 is a powerline 106 network. However, the communication is not so limited. Other exemplary networks include wireless, infrared, IRDA, and wired networks.

The transmitter module 104 is configured to combine the control signal with the audio signal produced by the input device 102 to form a combined signal. The transmitter module 104 is further configured to modulate the combined signal so as to convert the signals to a form which is compatible with transmission via the powerline 106. An exemplary method for this conversion includes the use of a media access control (MAC) protocol coupled with a physical layer (PHY). The MAC and PHY can utilize data packets for the transmission of the combined signal. The MAC protocol controls the sharing of a PHY layer among multiple transmitters 104 and receivers 108(a)-(n), while the PHY specifies the modulation, coding, and basic packet formats which are used to transmit along the powerline 106. An exemplary transmission technique used by the communication system 100 is orthogonal frequency division multiplexing (OFDM). The detail components which perform the conversion of the combined signal for its transmission via the powerline 106 are illustrated in, and will be explained with reference to, FIG. 5.

Alternatively, the audio signal and the control signal that are converted from an analog to a digital form are formatted at the input source 102 for their transmission. The formatted signals are sent to the network 106 without being processed by the transmitter 104.

The transmitter module 104 can connect with the powerline 106 via input power receptacle 105, such as a standard 3-prong electrical outlet. Alternatively, the transmitter module 104 is directly hard wired to the powerline 106. More detailed block diagrams of the transmitter module 104 are illustrated in, and will be described with reference to, FIGS. 2, 3, and 4. A process for formatting and transmitting a combined signal via the powerline 106, that can be performed by the transmitter module 104 of FIG. 1, is shown in, and will be described with reference to, FIG. 9.

The powerline 106 connects with one or more receiver modules 108(a)-(n) via an output power receptacle 107(a)-(n). The output power receptacle 107(a)-(n) operates in the same fashion as the input power receptacle 105. The output power receptacle 107(a)-(n) directly connects with the receiver module 108(a)-(n) while the input power receptacle 105 directly connects with the transmitter module 104. However, the input and output power receptacles can be cross identified depending on how they are utilized within the powerline communication system 100. For example, input power receptacle 105 can be used by the receiver module 108(a)-(n). Moreover, the input power receptacle 105 can be used simultaneously by the receiver module 108(a)-(n) and the transmitter module 104 to, for example, couple both for use in the same room of the home.

A powerline 106 is a difficult environment for audio signals. The communication path between any two power receptacle 105, 107 in the home can have a complicated transfer function with many branches of the powerline 106 having terminating loads at each receptacle with different impedances. Further, the transfer function can change with time due to the connection or removal of common electrical devices into the powerline 106. Thus, the amplitude and phase response of the powerline 106 can vary widely with frequency.

The network or receiver module 108(a)-(n) is configured to receive the data packets from the powerline 106 and extract the audio signal and the control signal included therein. The detail components which may be used to perform the extraction of the control and audio signals are illustrated in, and will be explained with reference to, FIG. 8.

The receiver module 108(a)-(n) utilizes the control signal to manipulate the audio signal. This manipulation can include, for example, detection of audio signal peaking and clipping. The receiver module 108(a)-(n) may be configured to automatically adjust the audio signal's level to adjust for detection of peaking or clipping. The receiver module 108(a)-(n) may also be configured to receive a code which determines a phase for the audio signal. The receiver 108(a)-(n) then manipulates the audio signal such that a desired phase relationship is maintained with other loudspeakers on the network based on the code. This can be accomplished by coding a time or phase delay in the control signal. More detailed block diagrams of the receiver module 108(a)-(n) are illustrated in, and will be described with reference to, FIGS. 6 and 7. A process for receiving and extracting the audio signal and the control signal from the received combined signal, that can be performed by the receiver module 108(a)-(b) of FIG. 1, is shown in, and will be described with reference to, FIG. 10.

Still referring to FIG. 1, an output device 110 is connected to the receiver module 108(a)-(n) and receives the manipulated audio signal from the receiver module 108(a)-(n). The output device 110 is configured to change the audio signal into sounds loud enough to be heard at a selected distance. Output devices 110 can include, for example, stereo loudspeakers, home theater loudspeakers, and headphones.

As one can now recognize, the communication system 100 of FIG. 1 provides wired connectivity between the input devices 102 and the output devices 110. As explained above, the network can be wired or wireless. For example, the network can use a wireless data transmission method, such as IrDA, to communicate between the input devices 102 and the output devices 108. IrDA is a standard defined by the IrDA consortium (Infrared Data Association) for both the input and output devices and the protocols they use to communicate with each other. IrDA specifies a way to wirelessly transfer data via infrared radiation using infrared light emitting diodes (IR-LED's). Moreover, a wireless data transmission method, such as radio frequency (RF), can be used for the network. An RF network uses the electromagnetic spectrum associated with radio wave propagation.

The input and output devices can be position at fixed or portable locations within the home. For example, receiver module 108(a) and receiver module 108(b) can be located in different areas of the home while communicating with transmitter module 104. The transmitter module 104 may service a few or several receiver modules 108(*a*)-(*n*).

Figure 1A:
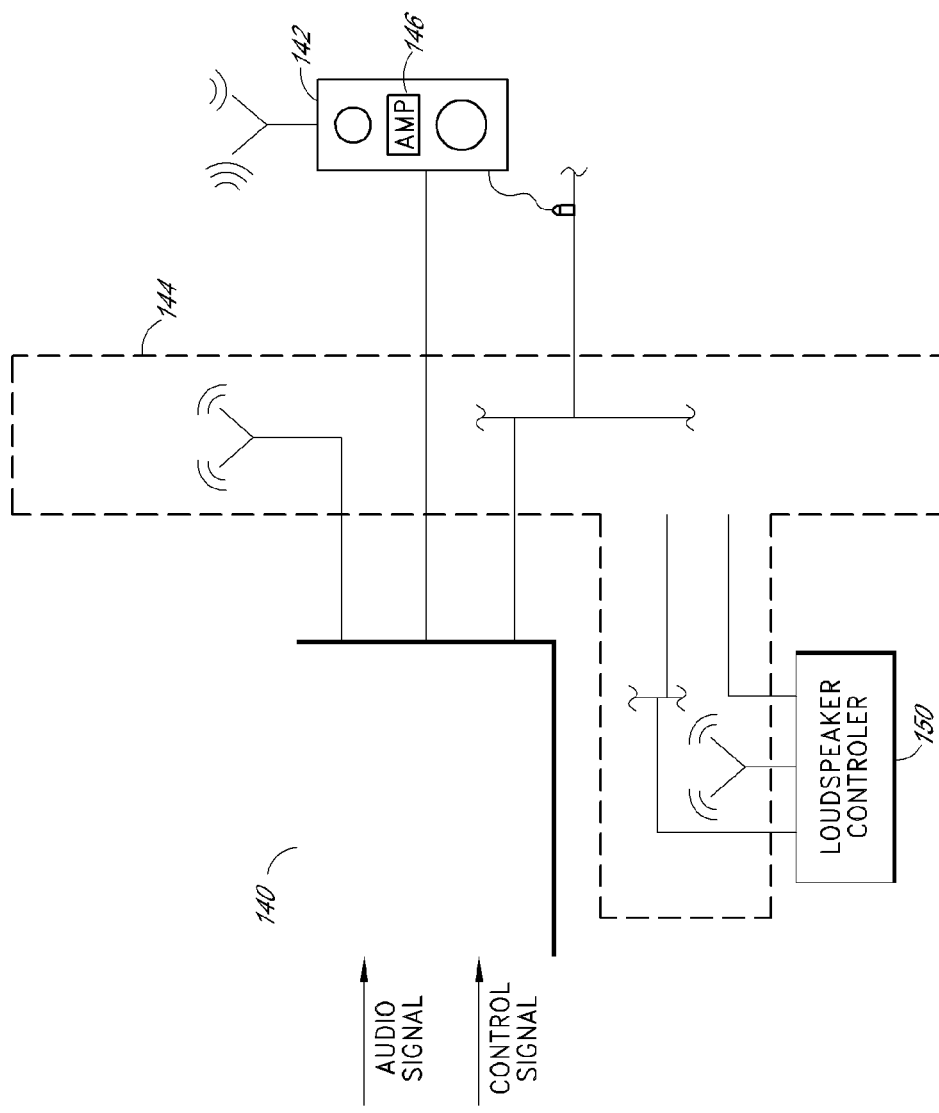
FIG. 1A is a block diagram of an embodiment of the communication system that has a set top box connected to a loudspeaker using a wired, wireless, or powerline network.

FIG. 1A is a block diagram of an embodiment of the communication system that has a set top box 140 connected to a loudspeaker 142 using a wired, wireless, or powerline network. The set top box 140 is configured to combine an audio signal and a control signal. The combined signal is transmitted via the network 144 to the loudspeaker 142.

The loudspeaker 142 is coupled to an amplifier 146. The amplifier 146 may be configured to amplify and\or manipulate the audio signal based on the control signal. The amplifier can thus be further coupled to or incorporate an equalizer (not shown). The equalizer is configured to manipulate the received audio signal prior to the loudspeaker 142 broadcasting the audio signal.

The communication system can further include a loudspeaker controller 150. The loudspeaker controller 150 connects to the network 144 and is configured to manipulate the equalizer of one or more loudspeakers 142. For example, the loudspeaker controller 150 can wirelessly connect to the loudspeaker 142 via the network 144. Alternatively, the loudspeaker controller 150 can connect via a wired network 144 to the loudspeaker 142. The wired network can be, for example, an Ethernet LAN or a powerline network.

The loudspeaker controller 150 can connect to the loudspeaker 142 via a different network than the network 144 utilized by the set top box 140. For example, the set top box 140 can connect to the loudspeaker 142 via the powerline network and the loudspeaker controller 150 connects to the loudspeaker 142 via a wireless network. The settings of the equalizer can be stored in the amplifier 146.

As another example, the loudspeaker controller 150 may connect with the loudspeaker 142 via the Internet or other wide-area network (WAN). In this example, the loudspeaker 142 can include web server software configured to allow the equalizer to receive its settings from the loudspeaker controller 150 via the Internet.

The loudspeaker 142 can further be configured to sense the broadcast signal levels from other loudspeakers. The processing of the sensed signal level may be performed internal to the loudspeaker 142. The sensed signal level is then utilized by the sensing loudspeaker and the other loudspeakers to dynamically adjust the equalizer and signal balance. Alternatively, the sensed signal level is transmitted to the loudspeaker controller 150, host, or other remote processor via the network where adjustments are calculated and transmitted to the loudspeakers.

Figure 2:
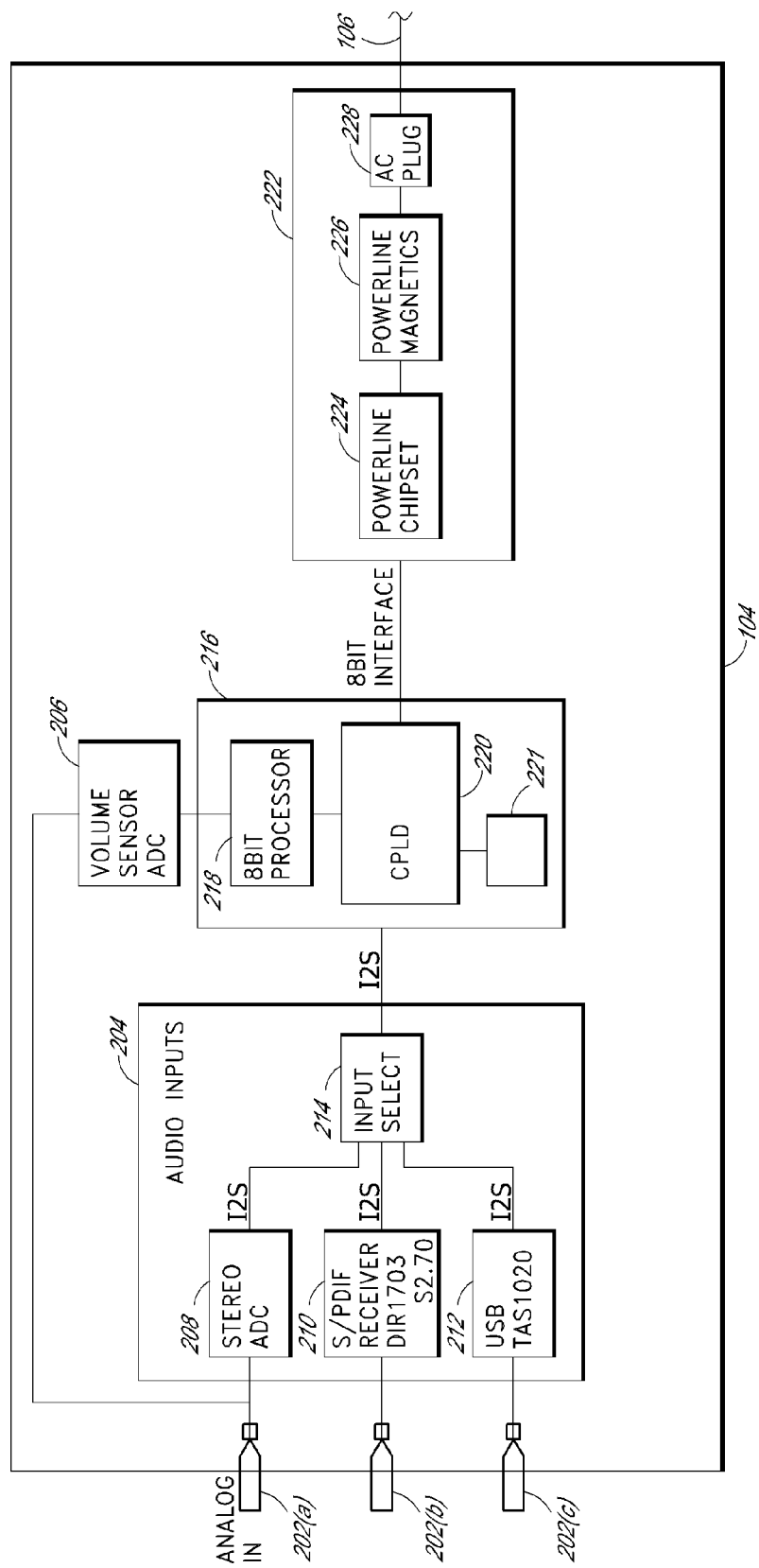
FIG. 2 is a block diagram of a first embodiment of the transmitter module from FIG. 1, which includes a plurality of audio inputs.

FIG. 2 is a block diagram of a first embodiment of the transmitter module 104 from FIG. 1. The transmitter module 104 is configured to receive, format, and transmit a combined signal via the powerline 106. The transmitter module 104 includes receptacles 202(*a*)-(*c*), an audio input connector 204, a signal processing module 216, a volume sensor analog to digital converter (A/D) 206 which is coupled to the signal processing module 216, and a powerline module 222. Each of these components is described in detail below.

The audio input connector 204 includes a plurality of connector designs for connecting with different input devices 102. For example, the audio input connectors can include RCA connector module 208, Universal Serial Bus (USB) module 212, miniplug, S/PDIF module 210, and SACD. The audio input connector 204 can further include any combination of digital and analog receptacles 202(*a*)-(*c*). For example, the RCA connector module 208 can be used to connect an analog stereo receiver to the transmitter module 104. For this connection, the audio input connector 204 is coupled to an analog receptacle 202(*a*) to receive the analog audio signal.

Coupled to the analog connector 202(*a*) is the volume sensor A/D 206. The volume sensor A/D 206 is configured to sense the input power level of the analog audio signal into the analog receptacle 202(*a*) and digitize the input power level. The volume sensor A/D 206 senses a RMS value of the audio signal. Depending on the value, the volume sensor A/D 206 changes the control signal. The sensitivity between changing the control signal in response to changes in the RMS value can vary. The control signal can be in an a variety of future developed formats, such as the well known $I^2C$ format. As explained below, the control signal is transmitted along with the audio signal via the powerline 106 as a combined signal.

The RCA connector module 208 can include an analog to digital converter (A/D). The A/D forms a digital signal from the inputted analog audio signal for its processing by the audio input connector 204.

The S/PDIF module 210 is configured to receive digital signals from the input devices 102 via the receptacle 202(*b*).

The USB connector module 212 is configured to connect the transmitter module 104 with a personal computer to receive a digital audio signal and an associated digital control signal. Since the control signal is in digital form, the volume sensor A/D 206 does not sense the control signal for the USB connector module 212 or the S/PDIF connector module 210. An embodiment of the USB connector module 212 is a Stereo USB Audio Interface, part number TAS1020, which is manufactured by Texas Instruments Incorporated. Texas Instruments Incorporated is located at 12500 TI Boulevard in Dallas, Tex. 75243-4136.

The audio input connector 204 further includes an input selector module 214. The audio input connector 204 is coupled to the RCA connector module 208, the S/PDIF module 210, and the USB connector module 212. The input selector module 214 is configured to select the input device 102 that is to have its audio signal transmitted by the transmitter module 104. The selected input source 102 can dynamically change from time to time.

The input selector module 214 receives digital signals, audio and control, from the selected input devices 102. Various bus designs can be used to couple the input selector module 214 to the input connectors to receive the digital signals. Exemplary bus designs that are used in the audio field include, for example, inter IC sound ($I^2S$).

Connected to the audio input connector 204 is the signal processing module 216. The signal-processing module 216 is configured to combine the digital signal, audio and control, from the input select module 214 with an analog control signal from the volume sensor A/D 206. For input sources 102 that provide a digital audio signal and digital control signal, the analog signal is not used. The control signal and the audio signal for the selected input device 102 forms the combined signal.

The signal processing module 216 includes a processor 218 coupled to the volume sensor A/D 206 for processing analog control signals. The processor 218 can be an 8-bit processor. The processor 218 is configured to control the volume sensor A/D 206. The signal-processing module 216 may further include a programmable logic device (PLD) 220. The PLD 220 is configured to combine the control signal with its associated audio signal. For example, the PLD 220 combines the audio signal from the audio input connector 204 with its associated control signal. The processor 218 can assist in the combining of the audio signal with the control signal. For analog input sources, the digital version of the control signal is provided by the processor 218 using information obtained from the volume sensor A/D 206. The PLD 220 is further configured to format the combined signal to be readable by the powerline module 222.

The signal processing module 216 may also include a destination source switch 221. The destination source switch 221 is configured to select a receiver 108(a)-(n) for receiving the combined signal. For example in FIG. 1, depending on the position of the destination source switch 221, any of the receivers 108(a)-(n) could receive the combined signal. Alternatively, more than one receiver 108(a)-(n) can receive the same combined signal. In one embodiment, the signal processing module 216 includes a digital signal processor (DSP) (not shown). The DSP is configured to process and encode the control signal and the audio signal. For example, the address of the destination receiver module 108(a)-(n) can be encoded by the DSP.

Coupled to the signal processing module 216 is the powerline module 222. The powerline module 222 is configured to modulate and transmit the combined signal via the powerline 106. The powerline module 222 includes a powerline chipset 224, a powerline magnetics module 226, and an A/C plug 228.

The combined signal is received by the powerline chipset 224 from the signal processing module 216. The powerline chipset 224 is configured to transform the combined signal into symbols. The symbols are then arranged into data packets for their transmission on the PHY via the powerline 106. The PHY can utilize one or more carrier frequencies. The detail components which perform the conversion of the combined signal for its transmission via the powerline 106 are illustrated in, and will be explained with reference to, FIG. 5.

The powerline magnetics module 226 is coupled to the powerline chipset 224. The powerline magnetics module 226 is configured to provide isolation between the low voltage powerline chip set 224 and the high voltage powerline 106. The powerline magnetics module 226 is further coupled to an alternating current (AC) plug 228. The AC plug 228 is configured to electrically connect the transmitter module 104 with the input power receptacle 105 (see FIG. 1) for transmission of the packets.

Figure 3:
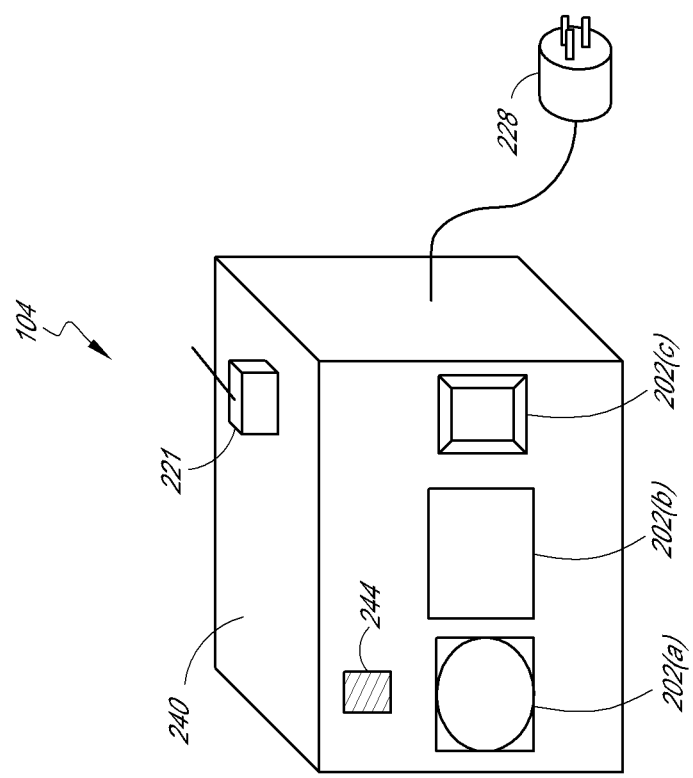
FIG. 3 is a perspective view of the transmitter shown in FIG. 2.

FIG. 3 is a perspective view of the transmitter module 104 shown in FIG. 2. The transmitter module 104 includes housing 240 and a plug 228. The housing includes a plurality of receptacles 202(a), (b), (c) each accessible for attaching a connector from input devices 102 to receive the audio signal. The housing 240 may include a control signal receptacle 244. In this embodiment, the control signal receptacle 244 receives a separate analog or digital control signal from an input device. Alternatively, and as described with reference to FIG. 2 above, a control signal is generated via the analog signal.

Figure 4:
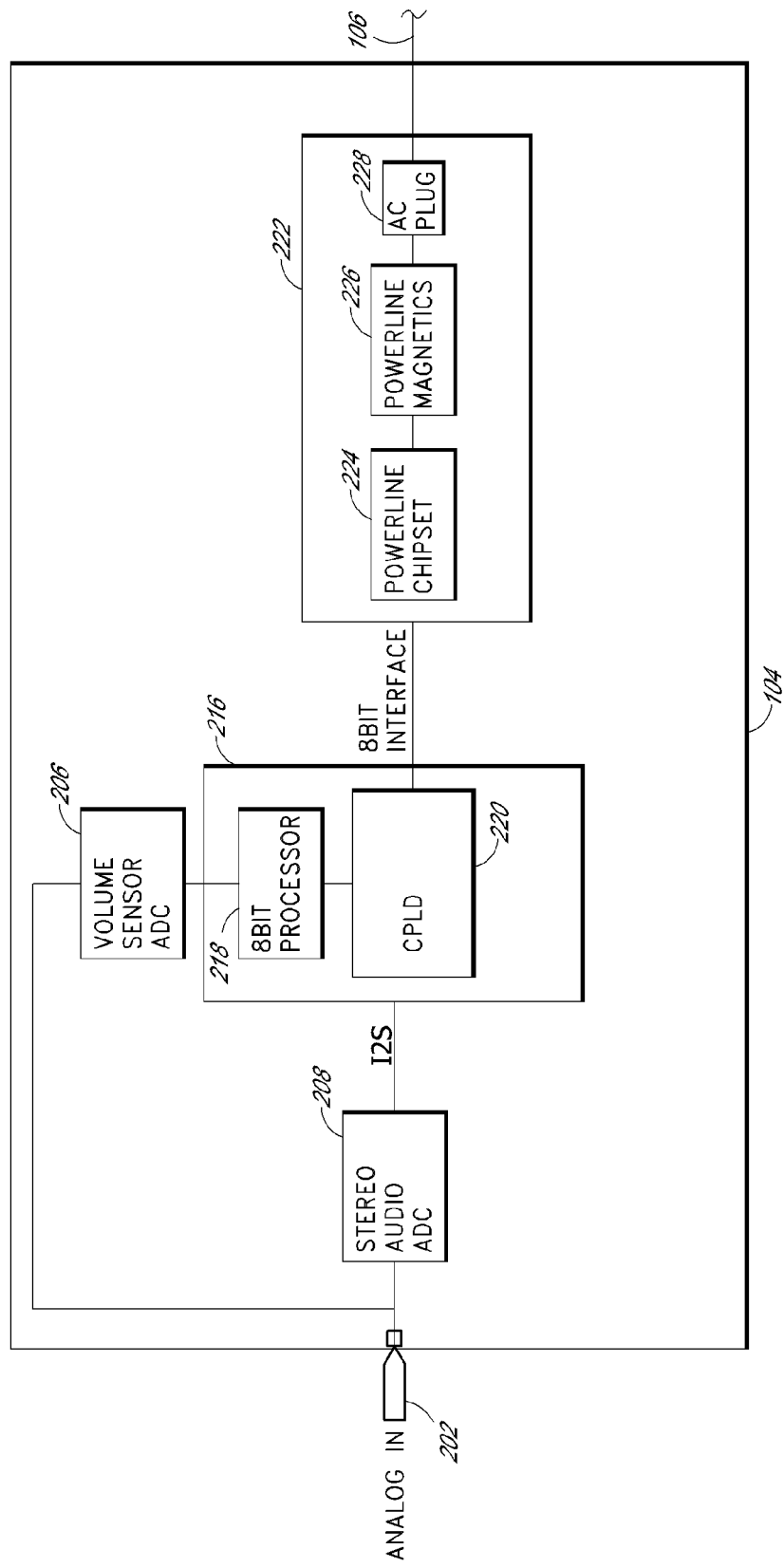
FIG. 4 is a block diagram of a second embodiment of the transmitter module from FIG. 1, which includes a single audio input.

FIG. 4 is a block diagram of a second embodiment of the transmitter module from FIG. 1. In contrast to the first embodiment shown in FIG. 3, the embodiment of FIG. 4 is specifically designed for receiving signals from analog input devices. Thus, FIG. 4 includes only the RCA connector module 208 from FIG. 3 for receiving input signals.

Figure 5:
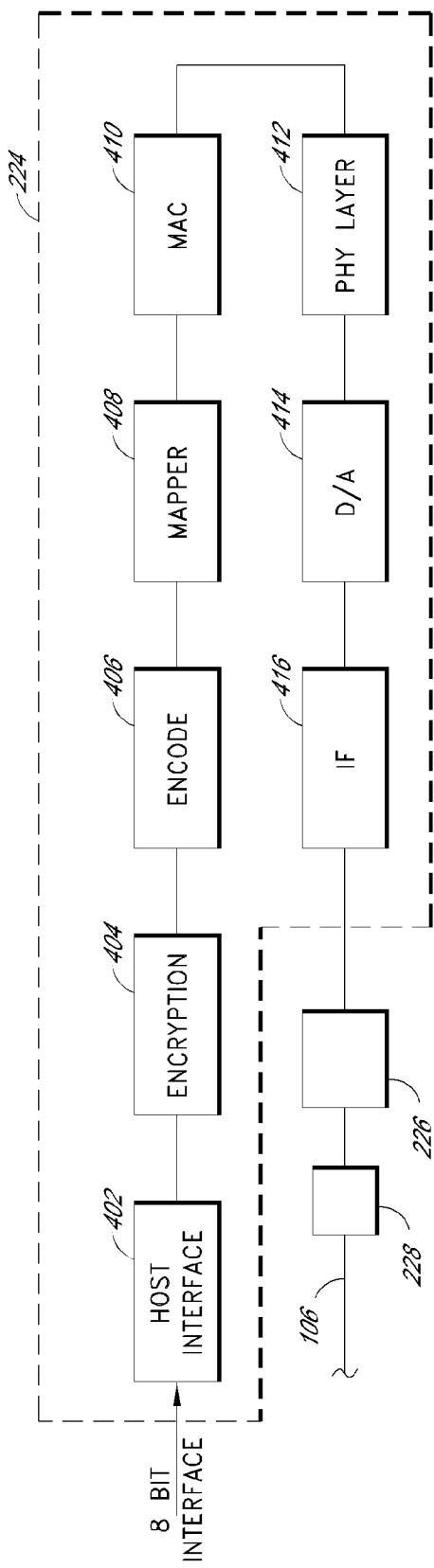
FIG. 5 is a block diagram of an Tx powerline module from FIG. 2.

FIG. 5 is a block diagram of the powerline chipset 224, from FIG. 2, which performs the conversion of the combined signal for its transmission via the powerline 106. The detail components of the powerline chipset 224 are described below.

The powerline chipset 224 receives the combined signal from the signal-processing module 216 via a host interface 402. The encryption module 404 receives the combined signal from the host interface 402. The encryption module 404 is configured to encrypt the combined signal so that it is unreadable except by authorized users, for example, a receiver 108 (a)-(n). Coupled to the encryption module 404 is an encode module 406. The encode module 406 is configured to encode the combined signal. Exemplary encoding techniques include Reed-Solomon encoding.

A media access control (MAC) protocol 410 controls the sharing of a PHY layer 412 among multiple transmitters 104 and receivers 108(a)-(n). In conjunction with the MAC protocol 410, the PHY layer 412 specifies the modulation, coding, and basic packet formats which are used to transmit along the powerline 106. An exemplary transmission technique used by the powerline communication system 100 is orthogonal frequency division multiplexing (OFDM).

OFDM divides the encoded signal into multiple parallel signals, each of which has a relatively low bit rate. Each encoded signal is provided to the mapper module 408. The mapper module 408 converts the bits to symbols prior to their modulation on the PHY layer 412. For example, the bit streams can form OFDM symbols. Alternatively, QAM symbols can be used.

The MAC protocol 410 arranges each series of symbols to form a payload for transmission in a data packet. Each payload can be associated with a frame control header. The frame control header includes MAC protocol 410 management information. For example, the packet's length and response status can be included in the frame control header. The data packet can further include a start-of-frame delimiter and an end-of-frame delimiter in addition to the payload and frame control header. For unicast transmissions to more than one receiver 108(a)-(n), the destination receiver 108 (a)-(n) can respond by transmitting a response delimiter indicating the status of its reception. As mentioned above, the delimiters can be intended for more than one of the receiver modules 108(a)-(n). However, the payload is intended for only the destination receiver module 108(a)-(n).

Each data packet is then modulated one of a series of closely spaced carriers, or subcarriers of the PHY layer 412, using, for example, OFDM. Many different types of modulation can be used to transmit the symbols on the individual carriers. Exemplary modulation techniques include differential quadrature phase shift keying (DQPSK) modulation and quadrature amplitude modulation (QAM), both well known in the art. DQPSK modulation encodes the data as the difference in phase between the present and previous symbol in time on the same subcarrier.

The payload is carried on subcarriers that have been previously agreed upon by the transmitter module 104 and destination receiver module 108(a)-(n) during a channel adaptation procedure. The subcarriers are selected based on the transfer function between the transmitter module 104 and the receiver module 108(a)-(n). For example, the transmitter module 104 could select a first set of subcarriers of the PHY layer 412 for transmission between itself and the receiver module 108(a). The receiver module 104 could then select a different set of subcarriers of the PHY layer 412 for transmission between itself and receiver module (b) based on the transfer functions between itself and receiver modules 108(a), 108(b).

A digital to analog module 414 converts the modulated signal to an analog form. The outgoing signal is then upconverted to an intermediate frequency 416 prior to its transmission.

Figure 6:
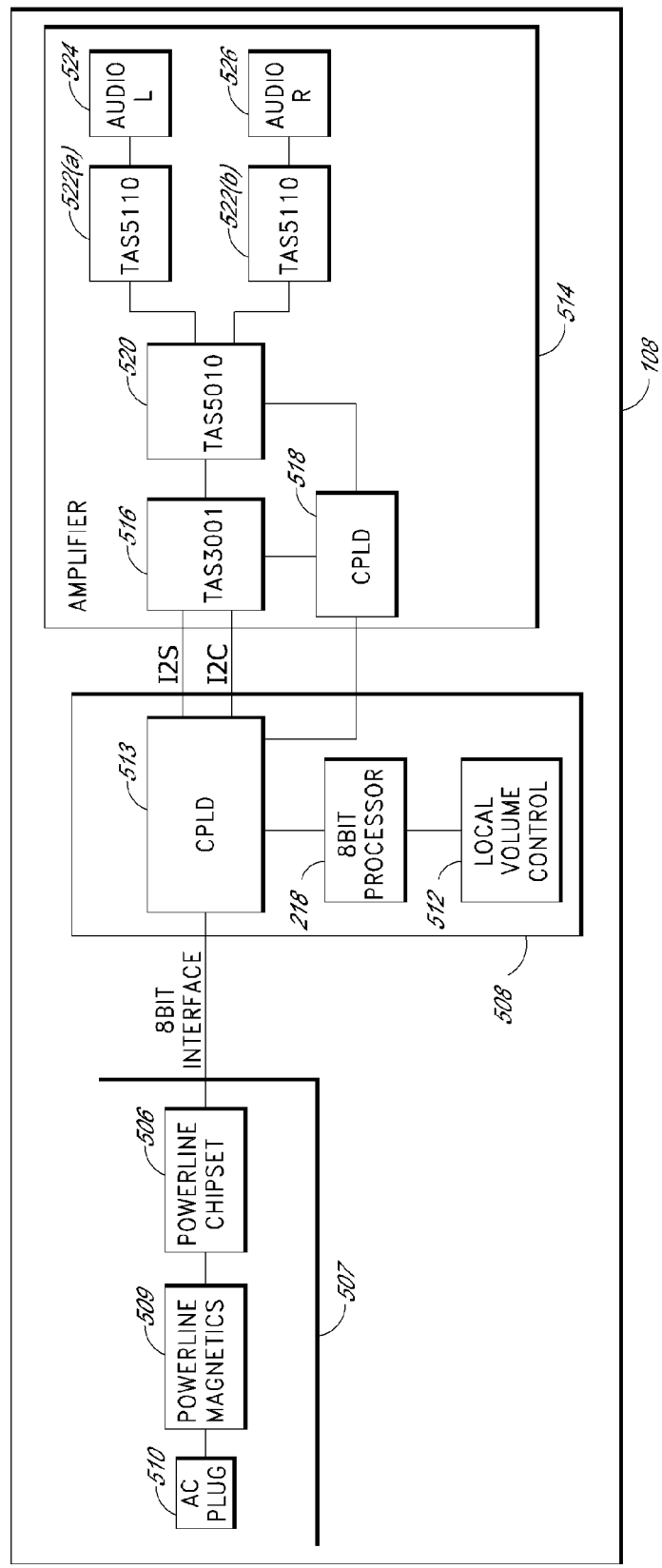
FIG. 6 is a block diagram of a first embodiment of the receiver module from FIG. 1, which includes an amplifier.

FIG. 6 is a block diagram of a first embodiment of the receiver module from FIG. 1, which includes an amplifier 514. The amplifier 514 can be a digital amplifier. Digital amplifiers internally process the audio signal in the digital domain. The receiver module 108 is configured to receive and unformat a combined signal received via the powerline 106. The receiver module 108 is further configured to manipulate and amplify the audio signal and then broadcast the amplified signal.

The receiver module 108 includes a powerline module 507, a signal processing module 508, and an amplifier module 514. The powerline module 507 is similar to the powerline module 222 described with reference to FIG. 2 except that it operates in a reverse configuration. The powerline module 507 is configured to receive and demodulate the combined signal via the powerline 106. The powerline module 507 includes a powerline chipset 506, a powerline magnetics module 509, and an A/C plug 510.

The alternating current (AC) plug 510 is configured to electrically connect the receiver module 108 with an input power receptacle 107(*a*)-(*c*) (see FIG. 1) to receive the packets. The AC plug 228 is further coupled to the powerline magnetics module 509. The powerline magnetics module 509 is configured to provide isolation between the low voltage powerline chip set 506 and the high voltage powerline 106. The powerline magnetics module 509 is coupled to the powerline chipset 506.

The symbols in the data packets are received by the powerline chipset 506. After their transmission on the PHY via the powerline 106, the symbols are removed from the data packets. The powerline chipset 506 is configured to transform the symbols into a combined signal. The detail components which perform the conversion of the data packets received via the powerline 106 are illustrated in, and will be explained with reference to, FIG. 8.

The signal processing module 508 is similar to the signal processing module 216 described with reference to FIG. 2 except that it receives the combined signal and extracts the audio signal from the control signal. The signal processing module 508 includes a processor 218. The processor 218 is coupled to a local volume control 512. The local volume control 512 is configured to allow a user to change the volume level of the audio signal broadcast by the loudspeaker. The signal-processing module 508 further includes a programmable logic device (PLD) 513. The PLD 513 is configured to extract or separate the control signal from its associated audio signal. The processor 218 can assist in separating the audio signal from the control signal. The audio signal can be in an I²S format while the control signal can be in an I²C format. The PLD 513 provides the signals to the amplifier 514.

Coupled to the signal-processing module 508 is the amplifier 514. The amplifier 514 receives the extracted audio signal and control signal from the signal-processing module 508. The amplifier 514 is configured to manipulate and amplify the audio signal and then broadcast the amplified signal. The amplifier includes a digital signal processor (DSP) module 516, an amplifier module 520, a power stage module 522(*a*)-(*b*), and outputs 524, 526.

The DSP module 516 is configured to manipulate the received audio signal based on the control signal associated with the received audio signal. The DSP module 516 can include a graphical user interface (GUI) for a user to control the DSP module 516. A PLD 518 can be coupled to the DSP module 516 to provide control logic. This logic can include processing additional channels, for example, subwoofer and center channels, for the amplifier 514. For example, the PLD 518 can create a delay in sending a center channel signal to the DSP module 516. An embodiment of the DSP module 516 is a Stereo Audio Digital Equalizer, part number TAS3001, which is manufactured by Texas Instruments Incorporated. Texas Instruments Incorporated is located at 12500 TI Boulevard in Dallas, Tex. 75243-4136.

The amplifier module 520 is coupled to the DSP module 516 and receives the manipulated I²S audio signal. The amplifier module 520 converts the I²S audio signal to a pulse width modulation (PWM) signal. An embodiment of the amplifier module 520 is a Digital Audio PWM Processor, part number TAS5010, which is manufactured by Texas Instruments Incorporated. The PWM signal is amplified by the power stages 522(*a*)-(*b*). An embodiment of the power stages 522 is a Digital Amplifier Power Stage, part number TAS5110, which is manufactured by Texas Instruments Incorporated. The amplified signal is broadcast via outputs 524, 526.

Figure 7:
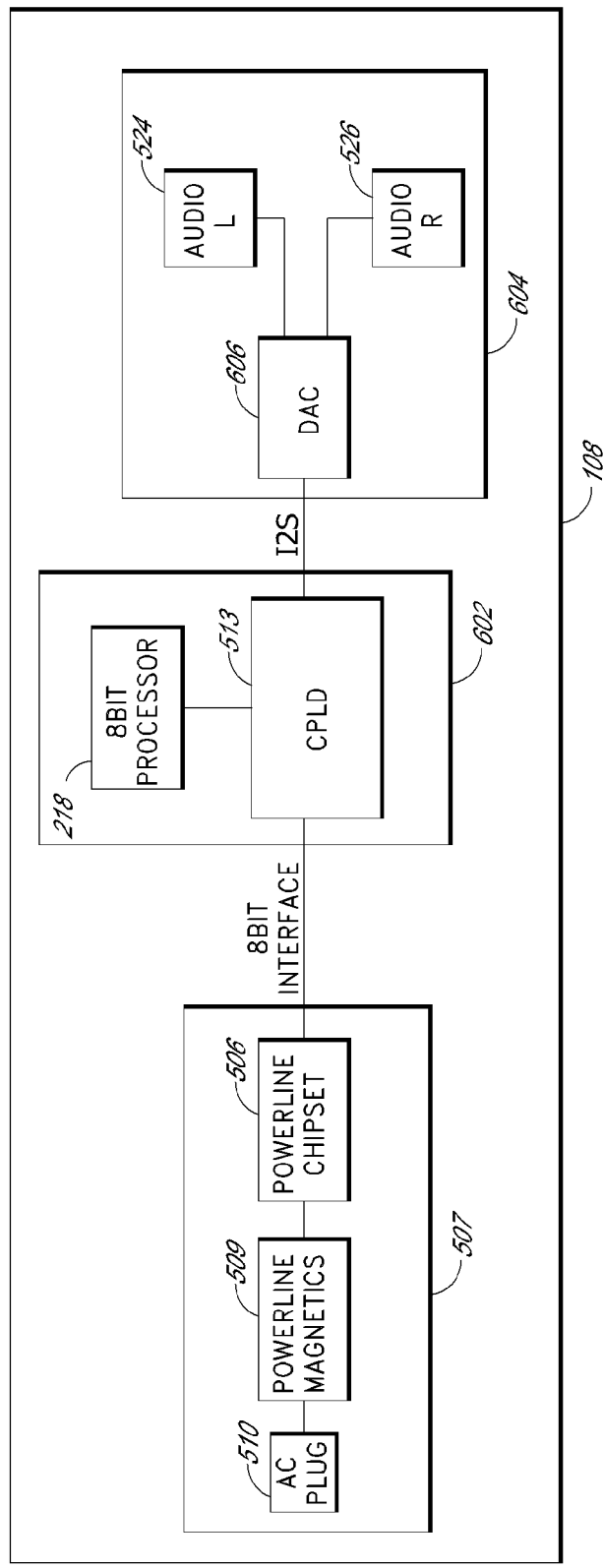
FIG. 7 is a block diagram of a second embodiment of the receiver module from FIG. 1.

FIG. 7 is a block diagram of a second embodiment of the receiver module 108 from FIG. 1. The second embodiment is similar to the first embodiment except that the signal-processing module 602 does not provide an I²C control signal. Moreover, the embodiment of FIG. 7 provides the I²S signal to an output module 604 and not to an amplifier. The output module 604 converts the I²S signal to an analog form for broadcast via outputs 524, 526.

Figure 8:
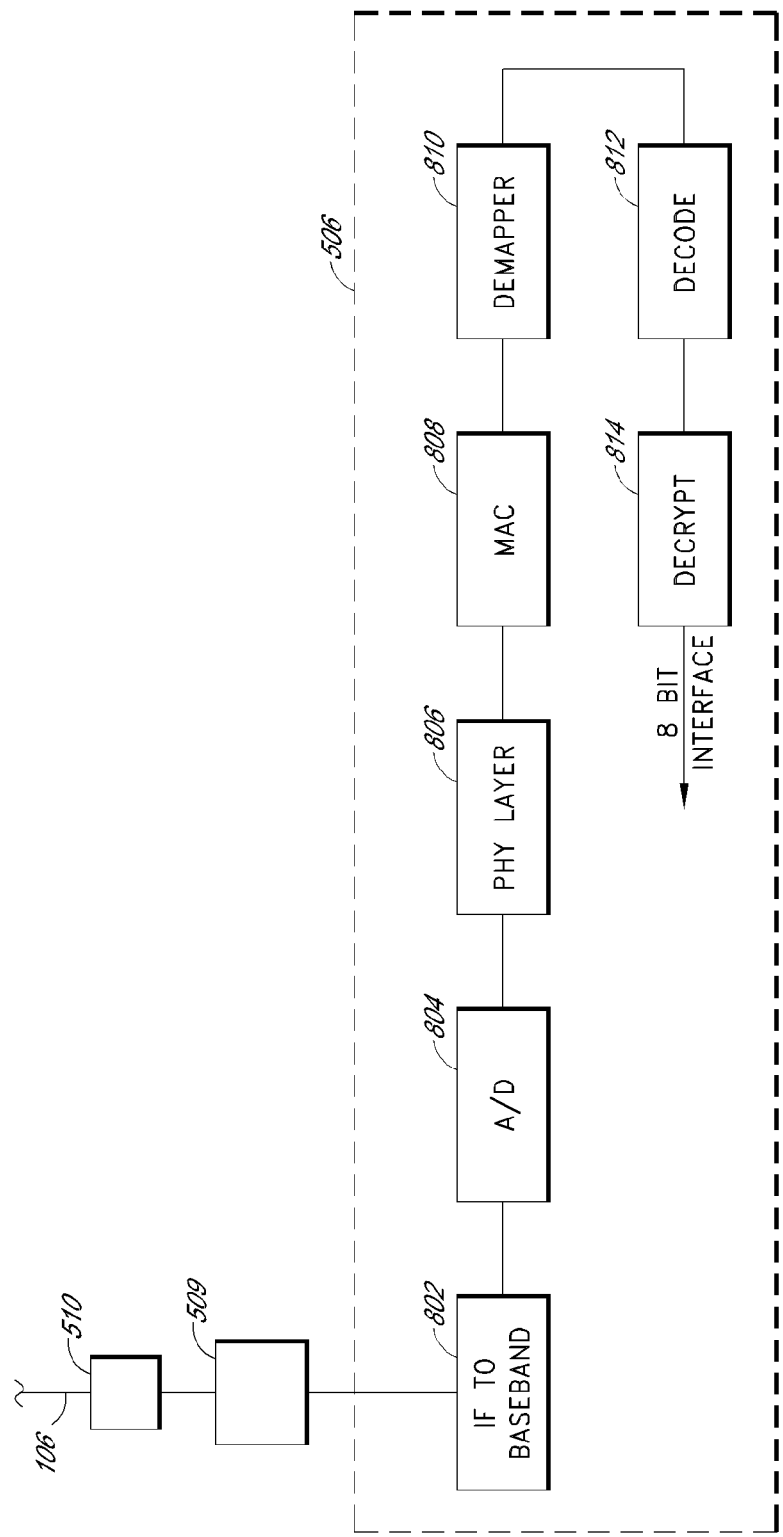
FIG. 8 is a block diagram of an Rx powerline module from FIG. 6.

FIG. 8 is a block diagram of the Rx powerline chipset 506 from FIG. 6. The Rx powerline chipset 506 operates similar to the Tx powerline chipset described in FIG. 5 except in a reverse configuration. The Rx powerline chipset 506 performs the conversion of the combined signal received via the powerline 106. The detail components of the Rx powerline chipset 506 are described below.

The incoming signal is downconverted from an intermediate frequency 802 to a baseband signal. An analog to digital module 804 converts the baseband signal to a digital form. The received data packet is demodulated from one of a series of closely spaced carriers, or subcarriers of the PHY layer 806. Many different types of modulation can be used to transmit the symbols on the individual carriers. Exemplary modulation techniques include differential quadrature phase shift keying (DQPSK) modulation and quadrature amplitude modulation (QAM), both well known in the art. DQPSK modulation encodes the data as the difference in phase between the present and previous symbol in time on the same subcarrier.

A media access control (MAC) protocol 808 controls the sharing of the PHY layer 806 among multiple transmitters 104 and receivers 108(*a*)-(*n*). In conjunction with the MAC protocol 808, the PHY layer 806 identifies the modulation, coding, and basic packet formats which were used to transmit along the powerline 106.

The MAC protocol 808 removes the symbols from the received data packet. Each data packet can be associated with a frame control header. The frame control header includes MAC protocol 808 management information. For example, the packet's length and response status can be included in the frame control header. The data packet can further include a start-of-frame delimiter and an end-of-frame delimiter in addition to the payload and frame control header. For unicast broadcast to more than one receiver 108(*a*)-(*n*), the destination receiver 108 (*a*)-(*n*) can respond by transmitting a response delimiter indicating the status of its reception. As mentioned above, the delimiters can be intended for more than one of the receiver modules 108(a)-(n). However, the payload is intended for only the destination receiver module 108(a)-(n).

The symbols are provided to the demapper 810. The demapper module 810 converts the demodulated symbols to bits. The bits are provided to a decode module 812. The decode module 812 is configured to decode the bits into a combined signal. Exemplary encoding techniques include Reed-Solomon encoding. Coupled to the decode module 812 is a decryption module 814. The decryption module 814 receives the combined signal from the decode module 812. The decryption module 814 is configured to decrypt the combined signal so that it is readable by the authorized user, for example, the receiver 108 (a). once decrypted, the powerline chipset 506 provides the combined signal to the signal-processing module 508.

Figure 9:
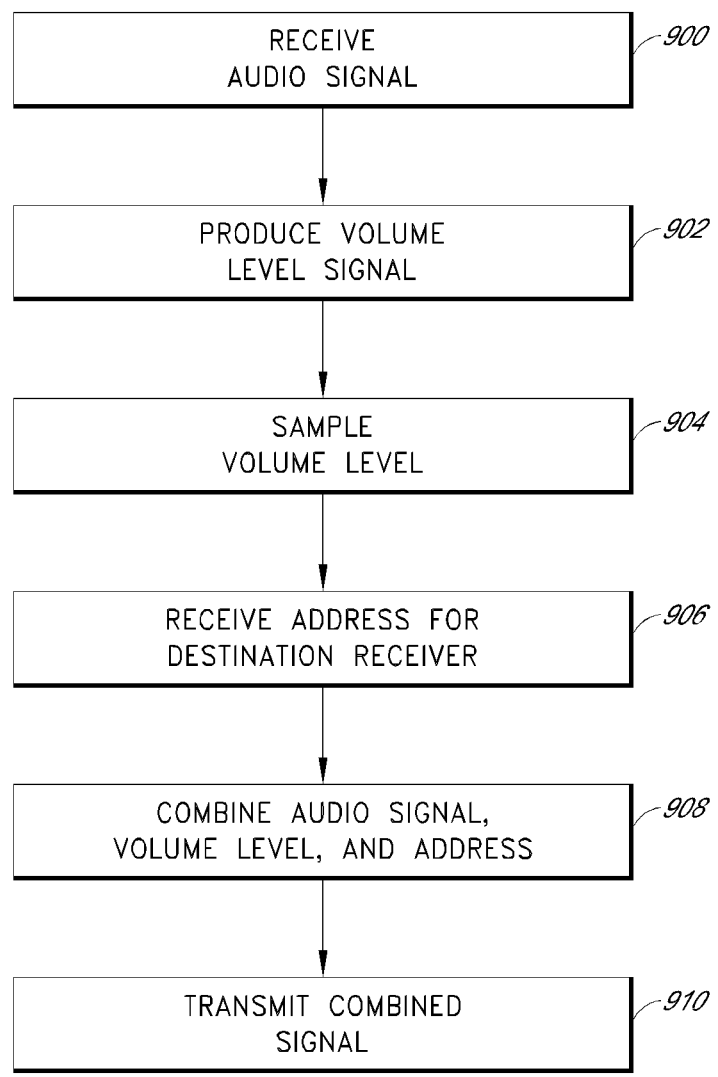
FIG. 9 is a flowchart of an exemplary process that is performed by the transmitter module to transmit a Tx signal and a Tx control signal into a powerline network.

FIG. 9 is a flowchart of an exemplary process that is performed by the transmitter module to transmit a Tx signal and a Tx control signal into the powerline 106 when the input is an analog audio signal. The process begins at a state 900 where the signal-processing module 216 receives an audio signal from the audio input connector 204. The process then moves to a state 902 where the analog audio signal is processes through, for example, low pass filtering or other additional signal processing to produce an analog volume signal level. The process moves to a state 904 where the volume sensor A/D 206 periodically samples the sensed volume and converts the sensed volume into a digital form. Next, at a state 906, the signal-processing module 216 receives the destination address of the receiver 108(a)-(n) from the destination source switch 221. Flow proceeds to a state 908 where the signal processing module 216 combines the audio and control signal into a combined signal. At a state 912, the powerline module 222 transmits the combined signal via the powerline 106 to the destination receiver (a)-(n).

Figure 10:
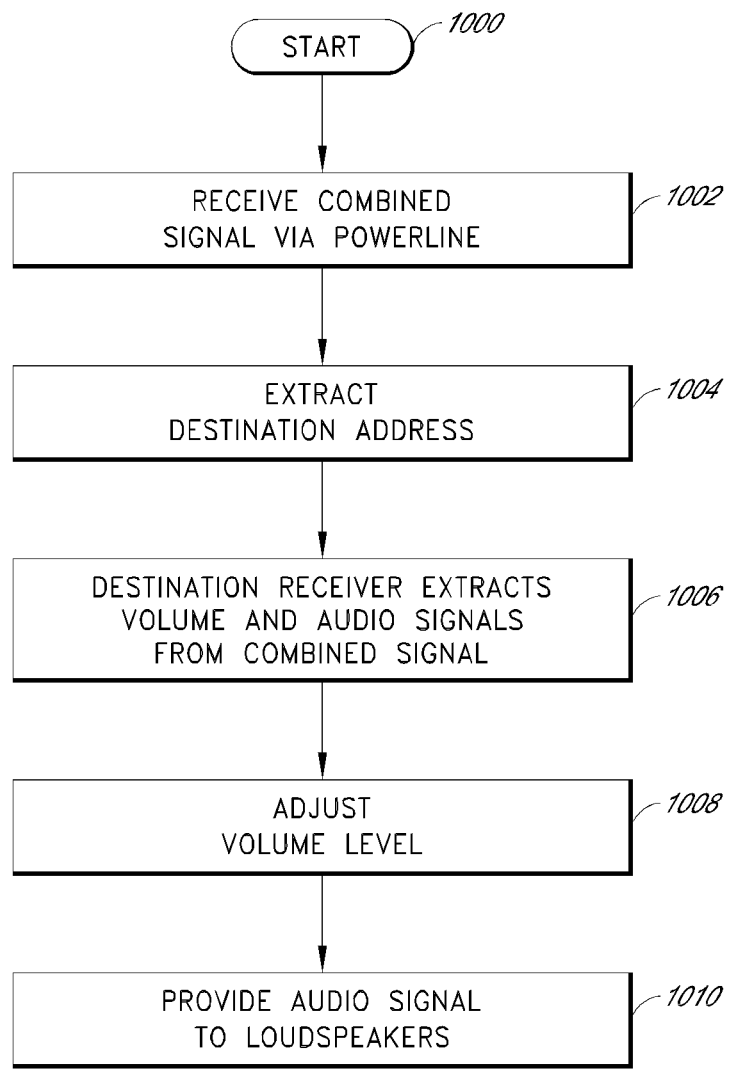
FIG. 10 is a flowchart of an exemplary process that is performed by the receiver module to receive an Rx signal and an Rx control signal from the transmitter module via the powerline network.

FIG. 10 is a flowchart of an exemplary process that is performed by a receiver module to receive an Rx signal and an Rx control signal from the transmitter module via the powerline 106. The process begins at a state 1000 where the combined signal is received by a destination receiver module via the powerline. The process moves to a state 1002 where the destination receiver module extracts its destination address from the combined signal. Flow moves to a state 1006 where the destination receiver extracts volume and audio signals from the combined signal. Next, at a state 1008, the receiver module adjusts the volume level of the audio signal based on the volume signal. Flow proceeds to a state 1010 where the receiver module provides the adjusted audio signal to the loudspeaker.

FIGS. 11-14 illustrate embodiments of the communication system that are configured to utilize an infrared (IR) transmission and reception technique to communicate within the network. However, the communication system is not so limited. Other exemplary transmission and reception techniques that are within the scope of the invention comprise wireless, powerline, and wired techniques. Thus, the following description equally applies to communication systems that use techniques besides IR as well as communication systems that use a combination of techniques within the network.

Figure 11:
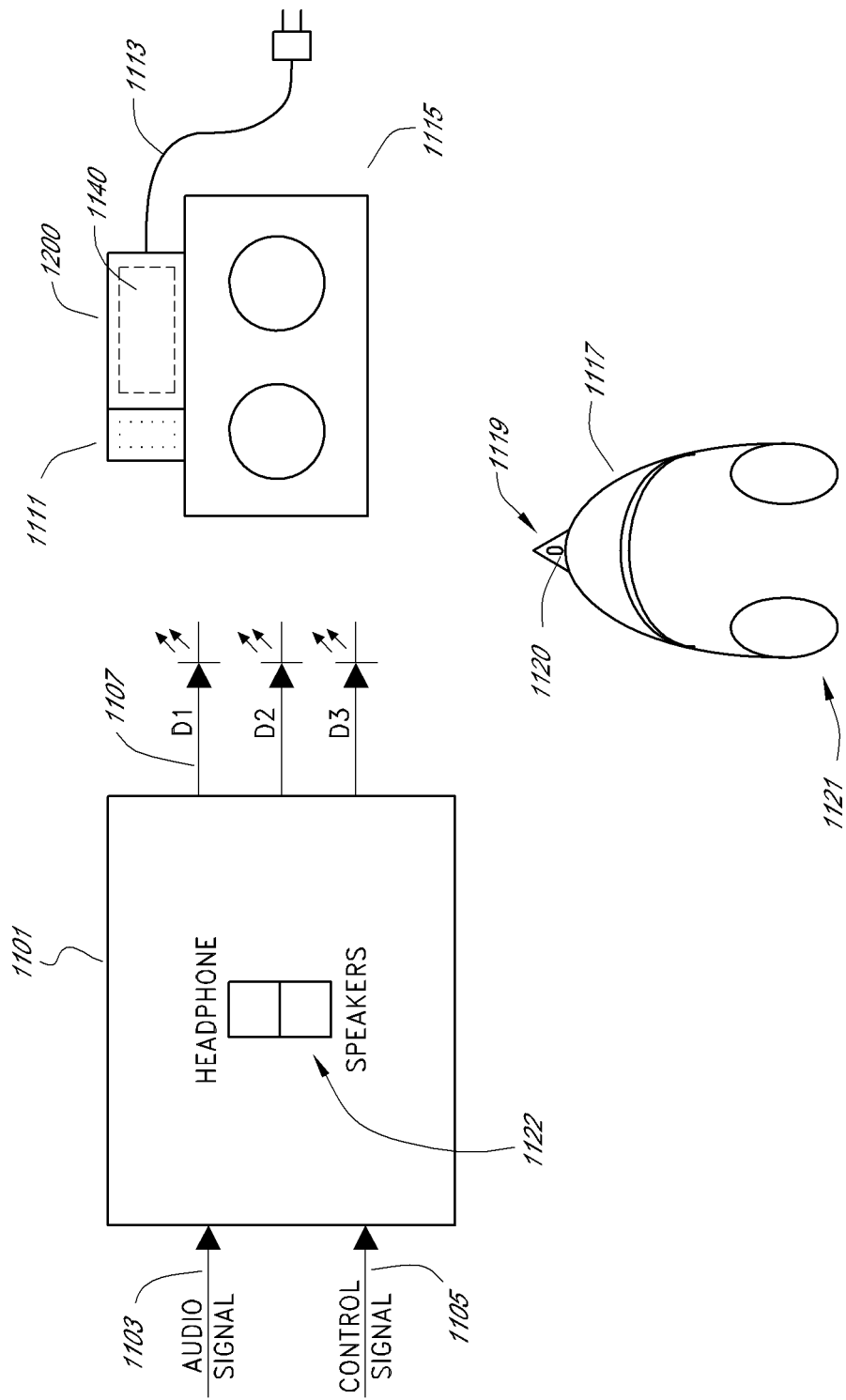
FIG. 11 is a block diagram of an embodiment of a communication system that utilizes an infrared (IR) network.

FIG. 11 is a block diagram of one embodiment of a communication system showing an infrared (IR) transmitter 1101 and a loudspeaker 1115 connected using an IR network. The IR transmitter 1101 is configured to combine an audio signal 1103 and a control signal 1105. Alternatively, the control signal 1105 is sensed via the audio signal 1103. The IR transmitter 1101 can include one or more diodes 1107. The diode 1107 is configured to transmit the combined signal in the infrared spectrum of electromagnetic radiation. In one embodiment, the combined signal is transmitted via the IR network to the loudspeaker 1115.

The loudspeaker 1115 can be coupled to a housing 1200. The housing includes one or more receiver components 1140, an IR detector 1111, and a power supply 1113. The receiver components 1140 are configured to receive the combined signal that is transmitted by the IR transmitter 1101. The receiver components 1140 provide the received combined signal to the loudspeaker 1115. As illustrated in FIG. 11, the housing 1200 includes one IR detector 1111. However, the housing can include additional IR detectors 1111. The IR detector 1111 is configured to receive the transmitted combined signal from the IR transmitter 1101. In another embodiment, the receiver components 1140 and the IR detector 1111 are incorporated within the loudspeaker 1115. In such a configuration, the IR detector 1111 can be incorporated into the external surface of the loudspeaker 1115. In still another embodiment, the IR detector 1111 is located external to the loudspeaker and coupled through the loudspeaker 1115 to internal receiver components.

In one embodiment, the IR transmitter 1101 is coupled to a headphone 1117 via the IR network. In this configuration, the IR transmitter 1101 transmits the combined signal via the diode 1107 to the headphone 1117. The transmitter is configured with a switch 1122 to create an address to enable operation of the speakers or headphones. For example, when the switch 1122 is set to headphones, only the headphones will play. When the switch 1122 is set to speakers, only the speakers receiving the audio signal will play. The switching can be accomplished by many alternative means such as by creating an address that will be transmitted along with the audio signal. The headphone 1117 can include receiver components 1119, one or more detectors 1120, and one or more loudspeakers 1121. The detector 1120 is configured to receive the combined signal from the IR transmitter 1101. The detector 1120 further provides the combined signal to the receiver components 1119. In one embodiment, a housing for the receiver components 1119 is shaped like a pyramid with detectors 1120 located on each of its four sides. In one embodiment, the receiver components 1119 are combined with the loudspeaker 1121 of the headphone 1117. As will be recognized by one skilled in the art, various combinations of these components can be selected while staying within the scope of the invention.

As explained above with reference to FIG. 1, the IR network of FIG. 11 can provide the combined signal to the loudspeaker 1115 and/or the headphone 1117 for a listener's enjoyment. In one embodiment, the receiver components of the system 1109 manipulates the audio signal portion of the combined signal based on the associated control signal prior to the audio signal's broadcast by the loudspeaker 1115. Similarly, the receiver components 1119 of the headphone 1117 can manipulate the audio signal portion of the combined signal based on the associated control signal prior to the audio signal's broadcast via the loudspeaker 1121 to the user.

Figure 11A:
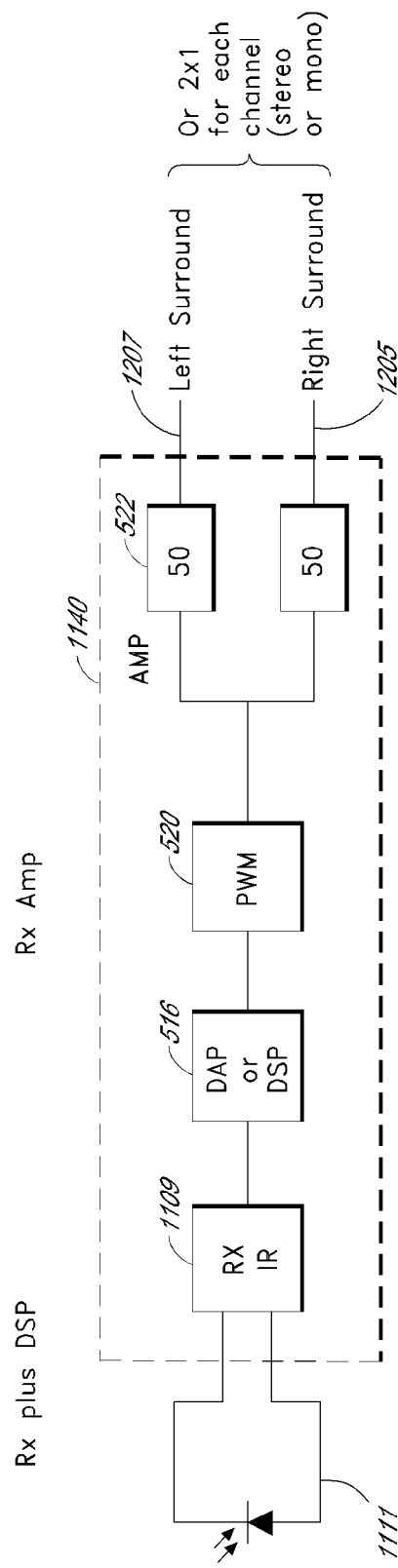
FIG. 11A is a block diagram of receiver components which can be located in a surround or speaker enclosure.

FIG. 11A is a block diagram of receiver components 1140 which can be located in a surround or speaker enclosure. The receiver components 1140 can comprise an IR receiver 1109, a DSP module 516 for multiple channels, an amplifier module 520, and power stage modules 522 for one or more surround or speaker channels. The IR receiver 1109 receives the transmitted audio signal from the IR detector 1111. The DSP module 516 processes the audio signal using any control information that was transmitted with the audio signal. The DSP module 516 can further enhance the signal using signal processing techniques known in the art. The amplifier module 520 can be configured as a pulse width modulation (PWM) converter/amplifier driven directly from a digital input from the DAP/DSP. The power stage modules 522 receive the audio power signal from the amplifier module 520 and provides the audio signal to the audio output lines 1205, 1207. The audio output lines provide the manipulated audio signal to one or more surround or speaker enclosures. The surround or speaker enclosure and associated receiver components 1140 can be configured to operate in mono or stereo depending on the system requirements.

FIG. 11B is a diagram showing multiple embodiments of a housing or speaker 1150 and associated receiver components 1140 from FIG. 11A. One embodiment of the speaker is a housing for a surround speaker. However, as illustrated in FIGS. 11B(1)-(5), the invention is not so limited. In the embodiment illustrated by FIG. 11B(1), the receiver components 1140 are mounted inside a speaker enclosure 1150. This enclosure can be any speaker. In the embodiment illustrated by FIG. 11B(2), the receiver components are mounted inside a stereo speaker 1150, all in one housing. One or more of the receiver components 1140 are mounted inside the enclosure. The receiver components may include signal processing techniques to enhance the audio signal to give the listener the impression of a wider separation of sound.

In the embodiment illustrated by FIG. 11B(3), the receiver components 1140 are mounted in various possible locations within a speaker stand. This embodiment integrates the stand and the receiver components. A user can advantageously select any standard speaker to receive the audio signal from receiver speaker outputs. The stand can be configured to operate in a mono or stereo mode. In the embodiment illustrated by FIG. 11B(4), the housing for the receiver is incorporated in a speaker wall mount. In this embodiment, the receiver housing, mount, and receiver components are integrated. As explained above with FIG. 11B(3), any standard speaker receives the audio signal from the receiver speaker outputs and is further mounted on the bracket. In the embodiment illustrated by FIG. 11B(5), the housing for the receiver components is wall mounted, floor mounted or mounted on a speaker. As explained above with FIG. 11B(3), any standard speaker receives the audio signal from the receiver speaker outputs.

The embodiments of FIG. 11B(1) and FIG. 11B(2) form complete speaker systems where the receiver components are integral with the speaker. The embodiments of FIGS. 11B(3), 11B(4) and 11B(5) are adapter systems which allow the user to transform any speaker system into a wireless system. This advantageously allows the user to incorporate the receiver components disclosed herein with a home entertainment system's pre-existing loudspeakers. Moreover, should the user decide to purchase new loudspeakers, the user may select from a myriad of speaker manufacturers and speaker designs for attachment to the receiver components.

The receiver components 1140 illustrated in FIGS. 11B(1) and 11B(2) can be configured to operate in a stereo or mono mode. In a preferred embodiment, the receiver components 1140 comprise the receiver module 1109, PWM amplifier 520, power stage modules 522, and power supply. The receiver components 1140 may or may not include DSP 516 and signal processing depending on the application.

The transmitter which transmits the audio signal to the loudspeakers shown in FIG. 11B can be mounted inside another speaker. For example, the transmitting speaker can be a center channel or other speaker. This is most likely to be a center channel for IR networks but alternatively, the subwoofer loudspeaker, left loudspeaker, right loudspeaker, effects loudspeaker, surround/satellite loudspeaker and the like is used instead of the center channel speaker 1140. In an embodiment where the IR transmitter 1101 is located in a center loudspeaker, the IR transmitter 1101 transmits the signal to the surround or satellite loudspeakers or subwoofer. The transmitter may be combined with one or more digital amplifiers which will be described with reference to FIG. 11C.

Figure 11C:
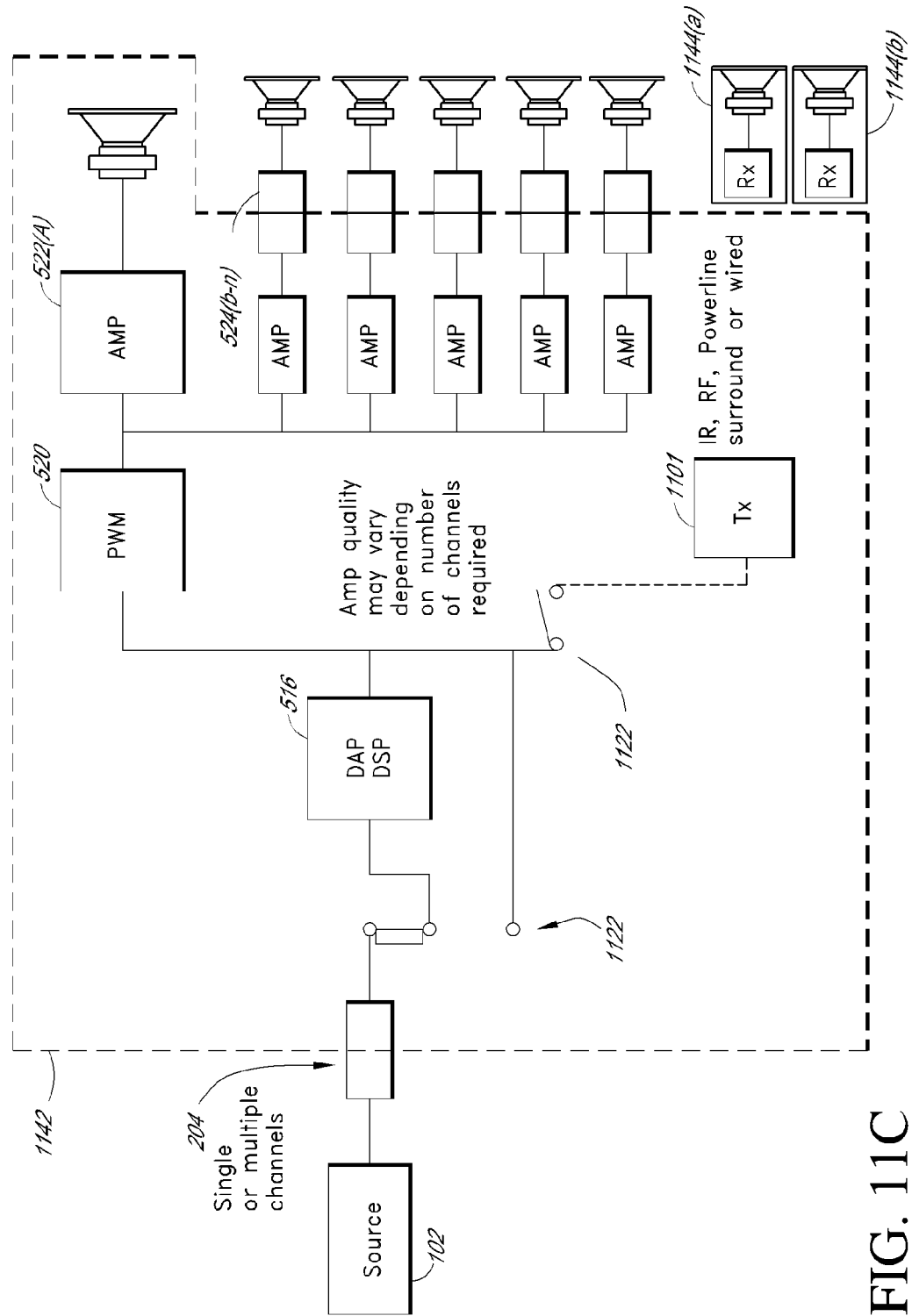
FIG. 11C is a block diagram of receiver components for a center channel loudspeaker that is configured to connect with one or more remote loudspeakers via a wireless, wired, or powerline network.

FIG. 11C is a block diagram of receiver components 1142 for a center channel loudspeaker. The receiver components 1142 comprise a DSP module 516 for multiple channels, a PWM converter/amplifier module 520, a power stage module 522 for the center channel, and an IR transmitter 1101. The multiple channels can be derived from various audio channel configurations. These channel configurations include, for example, stereo, 2.1, 3.1, 5.1, and 7.1 and the like. The DSP can process the signal into various channel configurations, such as Dolby Digital, DTS, SRS or alike. The DSP may further process control information such as equalizer information, volume or other signal processing information.

In the embodiment illustrated in FIG. 11C, the receiver components 1142 further comprise power stage modules 524(b)-(n) for other audio channels in addition to the amplifier for the center channel. In some embodiments, for example, the receiver components 1142 comprise power stage modules for the subwoofer loudspeaker, left loudspeaker, right loudspeaker, effects loudspeaker, surround/satellite loudspeaker and the like.

In operation, the receiver components 1142 receive an input signal from the input device 102. The input signal can be in the form of a digital or analog signal. The input signal(s) is provided to the receiver components 1142 via connector interface 204. The DSP module 516 processes the input signal for one or more of the channels. As shown in the embodiment of FIG. 11C, the DSP module 516 may process the input signals for all the channels, some of the channels or none of the channels.

A series of jumpers or switches 1122 allows the input signals for the speakers to be either processed by the DSP module 516, sent directly to PWM or transmitted to the speakers by the IR transmitter 1101. The IR transmitter 1101 is configured to transmit the combined signal to one or more speakers 1144(a)-(b). This other speaker can be a surround speaker or other speaker. In the embodiment illustrated in FIG. 11C, the IR transmitter 1101 in the center channel speaker encodes and transmits the combined signal to the surround or satellite speakers via an infrared network. Alternatively, the IR transmitter 1101 in the center channel speaker transmits the combined signal via powerline, RF, wireless, or a wired network to the surround or satellite speakers.

The amplifier module 520 is coupled to the DSP module 516 and receives the audio signal. The amplifier module 520 converts the audio signal to a pulse width modulation (PWM) signal. The PWM signal is amplified by the power stage 522. The amplified signal is broadcast via outputs 524(a)-(n).

Figure 12:
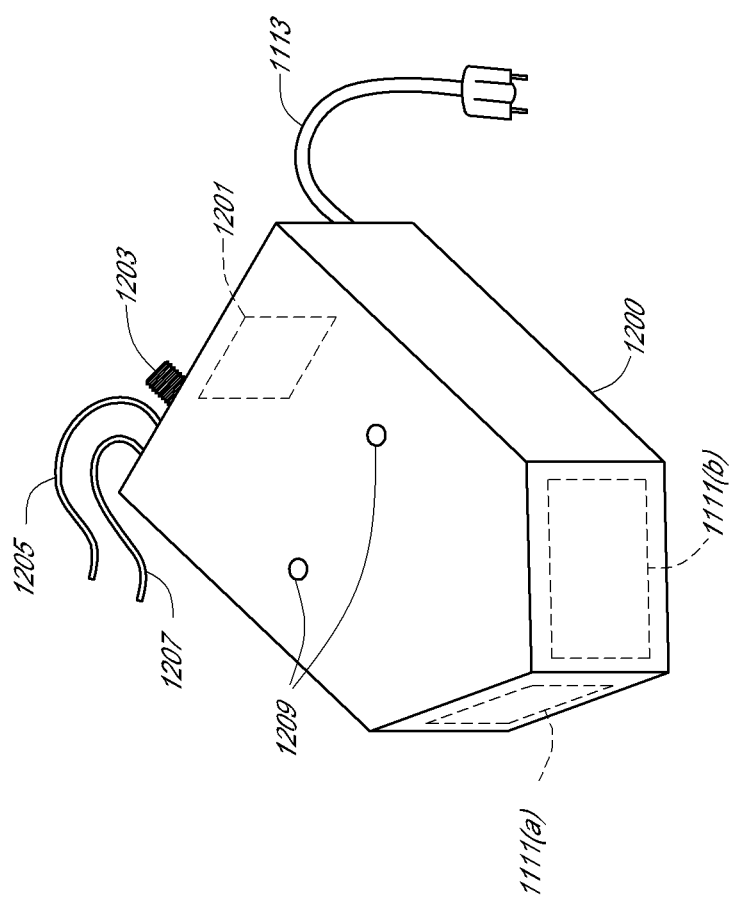
FIG. 12 is a perspective view of a housing for the receiver components from FIG. 11A.

FIG. 12 is a perspective view of a housing 1200 for the receiver components 1140 described in FIG. 11A. As shown in FIG. 12, the housing 1200 can include two detectors 1111(*a*), (*b*) and a power supply 1113 as described with reference to FIG. 11. Detectors can be located on the same or different surfaces of the IR receiver 1109. For example, the embodiment shown in FIG. 12 further includes detector 1201 on a different surface of the housing 1200. By locating one or more detectors 1111, 1201 on different surfaces of the housing 1200, the IR receiver can receive the transmitted combined signal from the IR transmitter 1101 from more than one direction. The housing 1200 can further include audio output lines 1205, 1207. The audio output lines provide the manipulated audio signal to one or more loudspeakers 1115 (see FIG. 11). In one embodiment, the housing 1200 includes a female or male fastener 1203 for mounting the housing 1200 to a speaker bracket. The housing 1200 can further include mounting holes 1209. The mounting holes 1209 allow the housing 1200 to be mounted inside or outside of the loudspeaker 1115.

Figure 13:
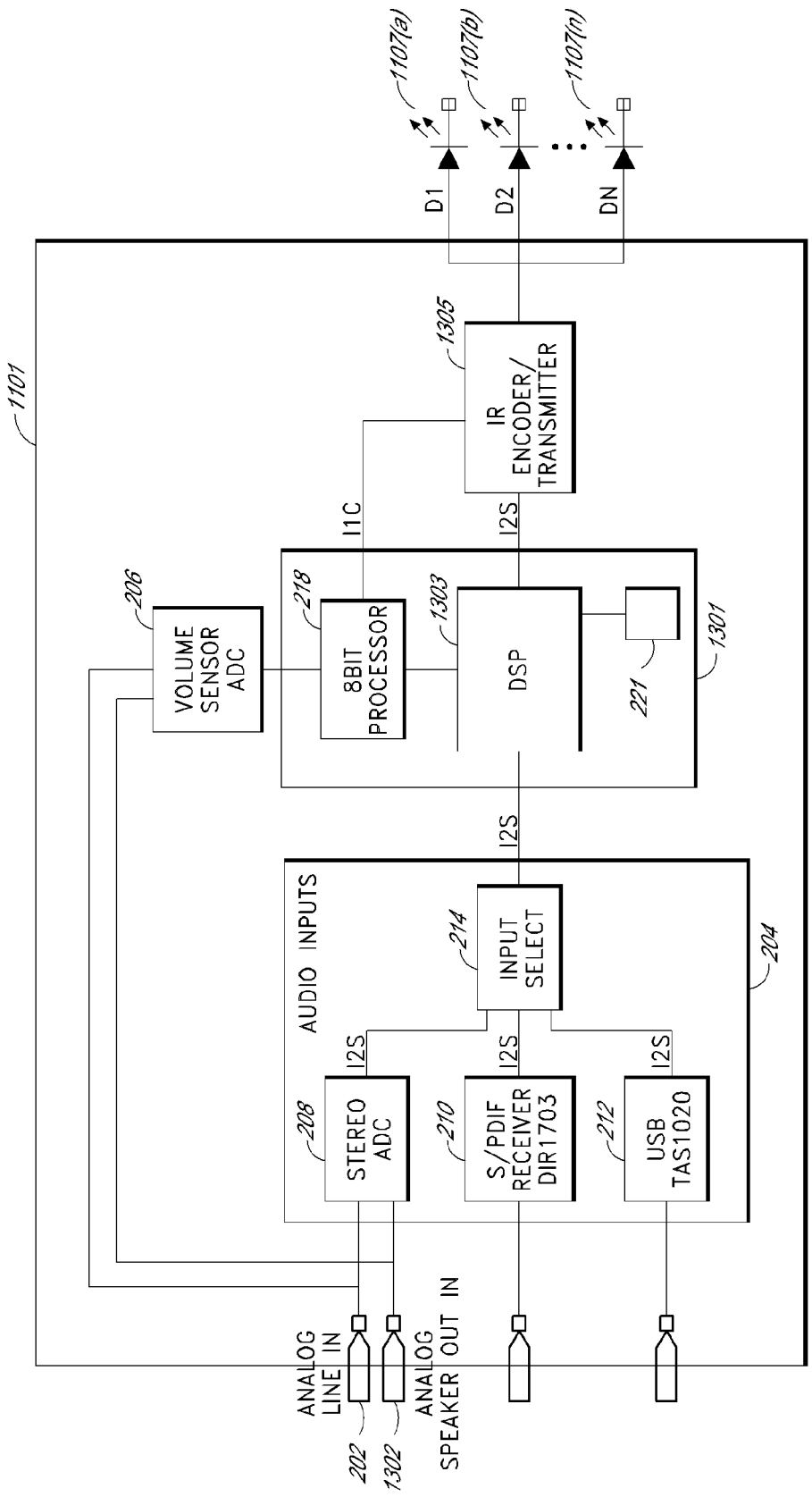
FIG. 13 is a block diagram of one embodiment of the IR transmitter shown in FIG. 11.

FIG. 13 is a block diagram of one embodiment of the IR transmitter 1101 shown in FIG. 11. The IR transmitter 1101 can be configured to receive, format, and transmit a combined signal via the IR network. The IR transmitter 1101 can comprise an audio input connector 204, a signal processing module 1301, a volume sensor analog-to-digital converter (A/D) 206, and an IR encoder/transmitter module 1305. The audio input connector 204 is the same as described with reference to FIG. 2 except that the audio input connector can additionally or alternatively comprise a speaker-level input connector 1302. The speaker-level input connector 1302 allows the IR transmitter 1101 to receive speaker level analog signals and line level analog signals. The volume sensor 206 is the same as described with reference to FIG. 2. The volume sensor analog-to-digital converter (A/D) 206 can be coupled to the signal processing module 1301. The IR encoder 1305 is further connected to transmitting diodes 1107(*a*)-(*n*).

The signal processing module 1301 can include an 8-bit processor 218, a digital signal processor 1303, and a destination source switch 221. The 8-bit processor 218 and the destination source switch 221 are the same as described with reference to FIG. 2. The digital signal processor 1303 can be configured to decode algorithms, for example, DTS, Dolby, Dolby Digital, and perform pre-processing before transmission by the IR transmitter 1101. The signal processing module 1301 provides the control signal and the audio signal to the IR encoder 1305. The IR encoder 1305 combines the audio signal and the control signal for its transmission via, for example, the diode 1107. In one embodiment, the DSP is configured to process and encode the control signal and the audio signal. For example, the address of the destination receiver module can be encoded by the DSP. In this embodiment, the destination source switch 221 is not utilized.

Figure 14:
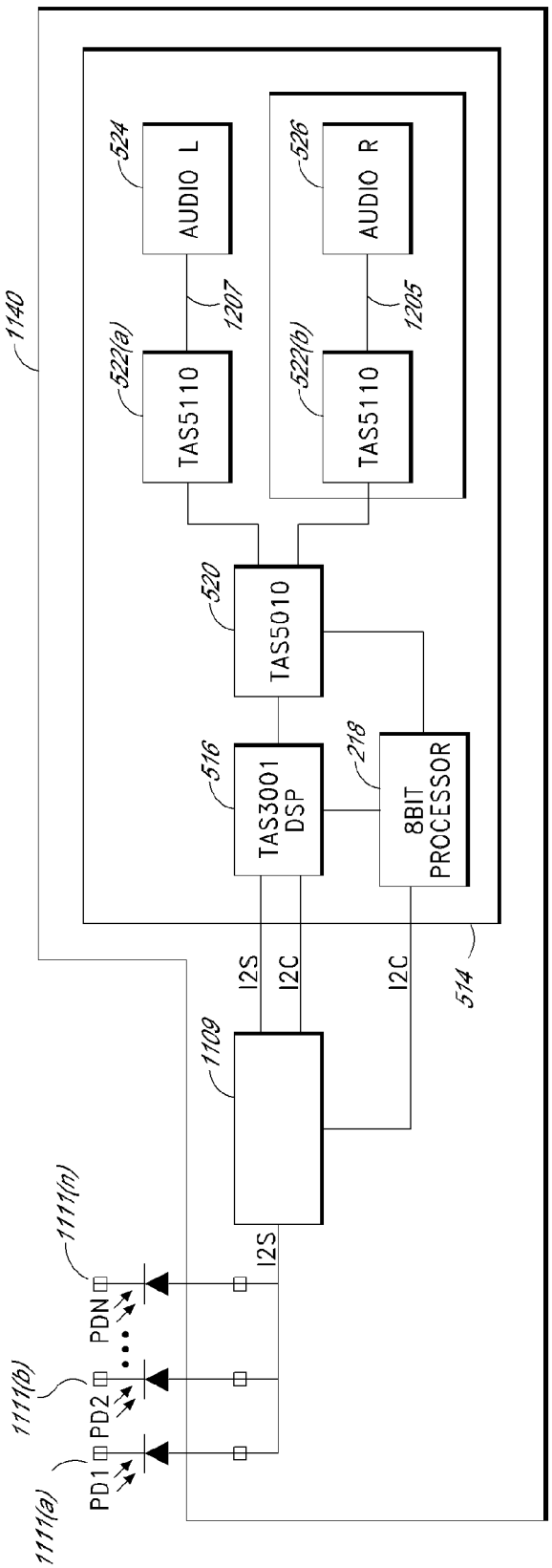
FIG. 14 is a block diagram of audio and control signal paths through an embodiment of the receiver components 1140 from FIG. 11.

FIG. 14 is a block diagram of audio and control signal paths through an embodiment of the receiver components 1140 from FIG. 11. For ease of explanation, the following describes the IR receiver components 1140. However, the following description also applies to the headphone embodiment of the IR receiver 1119. The receiver components 1140 are configured to receive and decode the combined signal received via the IR network. The receiver components 1140 can be further configured to manipulate and amplify the audio signal and then broadcast the amplified signal. One embodiment of the receiver components 1140 includes optical detector 1111(*a*)-(*n*), IR receiver 1109, and an amplifier module 514.

The detector 1111 is configured to receive the combined signal transmitted by the IR transmitter 1101 (see FIG. 11). The detector 1111 provides the combined signal to the IR receiver 1109. As shown in FIG. 14, the combined signal can be in an I²S format. Other formats for transmitting the combined signal are within the scope of the invention. The IR receiver 1109 receives the combined signal via the detector 1111. The decoder/receiver 1109 is configured to decode and extract the audio signal from the control signal. In embodiments where an address corresponding to a destination receiver is transmitted, the extracted signals are only provided to the amplifier module 514 of the destination receiver. In one embodiment, the 8-bit processor 218 is configured to receive the address and determine whether its associated received corresponds to the address. If the address does not correspond, the receiver will enter a standby mode and not amplify the signal. Thus, depending on whether the address corresponds to the receiver receiving the signal, that receiver can be enabled and amplify the signal, or disabled and not amplify the signal. In one embodiment, the receiver components 1140 time out in response to not receiving their address for a period of time and power down to a standby mode. If the transmitted address changes and corresponds to the receiver components 1140 in standby mode, the receiver will be enabled, power up, and play.

The amplifier 514 receives the extracted audio signal and control signal from the IR receiver 1109. The amplifier 514 is configured to manipulate and amplify the audio signal and then broadcast the amplified signal. The amplifier 514 can include, for example, a digital signal processor module 516, an amplifier module 520, a power stage module 522(*a*)-(*b*), and outputs 524, 526. The components of the amplifier 514 are the same as described above with reference to FIG. 5.

The foregoing description details certain preferred embodiments of the present invention and describes the best mode contemplated. It will be appreciated, however, that no matter how detailed the foregoing appears in text, the invention can be practiced in many ways. The embodiments of the receivers herein disclosed can be fixed or modular in design. For example, the digital amplifier can be designed for a DSP/DAP to plug into a digital bus. For a modular design, the receiver is configured to connect via Ethernet, wireless, wired, powerline, infrared, and/or RF through a common bus. Examples of common bus designs include I²S, I²C, parallel, and serial.

As is also stated above, it should be noted that the use of particular terminology when describing certain features or aspects of the present invention should not be taken to imply that the terminology is being re-defined herein to be restricted to including any specific characteristics of the features or aspects of the invention with which that terminology is associated. The scope of the present invention should therefore be construed in accordance with the appended claims and any equivalents thereof.

What is claimed is:

1. An apparatus configured to transmit an audio signal and a control signal associated with the audio signal via a network, the apparatus comprising:
    an audio input module having a first receptacle and a second receptacle, both configured to attach to an input device;
    an input selector module configured to select the first receptacle and the second receptacle;
    a signal processing module configured to receive the audio signal associated with the selected receptacle and combine the audio signal with a control signal to form a combined signal, the control signal including a volume level extracted from only the audio signal; and a network module configured to format and transmit the combined signal which includes the volume level via the network.

2. The apparatus of claim 1, wherein the combined signal includes an address signal which is associated with a loudspeaker.

3. The apparatus of claim 1, wherein the network is wired.

4. The apparatus of claim 3, wherein the network is a powerline.

5. The apparatus of claim 1, wherein the network is wireless.

6. The apparatus of claim 5, wherein the network is RF.

7. The apparatus of claim 5, wherein the network is IR.

8. The apparatus of claim 1, wherein the signal processing module is configured to convert the audio signal from an analog form to a digital form.

9. The apparatus of claim 1, wherein the control signal is analog.

10. The apparatus of claim 1, wherein the audio signal is digital.

11. The apparatus of claim 1, wherein the control signal is digital.

12. The apparatus of claim 1, wherein the control signal is a balance level.

13. The apparatus of claim 1, wherein the control signal is a fader level.

14. The apparatus of claim 1, wherein the control signal is a sub-bass level.

15. The apparatus of claim 1, wherein the control signal is a destination source.

16. The apparatus of claim 1, wherein the control signal is a sound processing selection.

17. The apparatus of claim 1, wherein the control signal is an equalizer level.

18. The apparatus of claim 1, wherein the control signal is an address.

19. The apparatus of claim 1, wherein the control signal is a power on.

20. The apparatus of claim 1, wherein the control signal is a power off.

21. The apparatus of claim 1, wherein the control signal is a time delay.

22. The apparatus of claim 1, wherein the control signal is a phase delay.

23. The apparatus of claim 1, wherein the input selector module is configured to power on in response to receiving the audio signal.

24. The apparatus of claim 1, wherein the input selector module is configured to power off in response to not receiving the audio signal for a period of time.

25. The apparatus of claim 1, wherein the control signal is in an $I^2C$ format.

26. The apparatus of claim 1, wherein the audio signal is in an inter IC sound ($I^2S$) format.

* * * * *